(12) United States Patent
Lee et al.

(10) Patent No.: US 12,131,054 B2
(45) Date of Patent: Oct. 29, 2024

(54) STORAGE DEVICE

(71) Applicant: SAMSUNG ELECTRONICS CO., LTD., Suwon-si (KR)

(72) Inventors: Kyoung Eun Lee, Hwaseong-si (KR); Yusuf Cinar, Yongin-si (KR); Hyun Joon Yoo, Suwon-si (KR); Byung Il Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 28 days.

(21) Appl. No.: 17/877,297

(22) Filed: Jul. 29, 2022

(65) Prior Publication Data

US 2023/0153014 A1 May 18, 2023

(30) Foreign Application Priority Data

Nov. 12, 2021 (KR) .................. 10-2021-0155687
Feb. 15, 2022 (KR) .................. 10-2022-0019636

(51) Int. Cl.
*G06F 3/06* (2006.01)
*G06F 1/18* (2006.01)

(52) U.S. Cl.
CPC ............ *G06F 3/0653* (2013.01); *G06F 1/181* (2013.01); *G06F 3/0619* (2013.01); *G06F 3/0652* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | |
|---|---|---|
| 6,621,694 B2 | 9/2003 | Lee et al. |
| 7,291,784 B2 | 11/2007 | Moore et al. |
| 7,719,834 B2 | 5/2010 | Miyamoto et al. |
| 7,843,689 B2 | 11/2010 | Moore et al. |
| 7,916,487 B2 | 3/2011 | Bitton et al. |
| 8,138,929 B2 | 3/2012 | Yen et al. |
| 9,135,957 B2 | 9/2015 | Grobe et al. |

(Continued)

FOREIGN PATENT DOCUMENTS

| | | |
|---|---|---|
| CN | 205302945 U | 6/2016 |
| KR | 20170000284 A | 1/2017 |

OTHER PUBLICATIONS

Amazon. "MHQJRH M.2 2280 SSD heatsink." Nov. 2018. https://www.amazon.com/MHQJRH-heatsink-Double-Sided-Thermal-Silicone/dp/B07KDDKDNN.*

*Primary Examiner* — Nathan Sadler
(74) *Attorney, Agent, or Firm* — Fish & Richardson P.C.

(57) ABSTRACT

A storage device includes a memory module including a memory device, a module board including a memory controller configured to control the memory device, and a memory connector disposed on one side of the module board. The storage device also includes a first enclosure disposed on a first surface of the memory module, a second enclosure disposed on a second surface opposite to the first surface of the memory module, and a first sensor disposed on the first enclosure and configured to detect a state and provide a signal for the state to the memory controller. The first enclosure includes a first long side extending in a first direction and a first short side extending in a second direction perpendicular to the first direction. A ratio of the first long side to the first short side ranges from 1.2 to 3.5.

20 Claims, 18 Drawing Sheets

(56) References Cited

U.S. PATENT DOCUMENTS

| | | | |
|---|---|---|---|
| 10,372,168 B1* | 8/2019 | He | G06F 1/20 |
| 10,408,684 B2 | 9/2019 | Jadhav | |
| 10,416,731 B2 | 9/2019 | Heyd et al. | |
| 2014/0101371 A1* | 4/2014 | Nguyen | G06F 1/206 |
| | | | 711/103 |
| 2014/0181363 A1* | 6/2014 | Hoang | G11C 16/22 |
| | | | 711/103 |
| 2016/0328584 A1* | 11/2016 | Rokhsaz | G06K 7/10326 |
| 2019/0278491 A1* | 9/2019 | Rayaprolu | G06F 3/0619 |
| 2020/0042207 A1* | 2/2020 | Kwak | G06F 3/0634 |
| 2020/0240263 A1* | 7/2020 | Sherrit | E21B 47/12 |
| 2020/0413568 A1* | 12/2020 | Stathakis | H05K 7/20418 |
| 2021/0225412 A1 | 7/2021 | Okano et al. | |

* cited by examiner

121

CV1
CV2
VC

STORAGE DEVICE

This application claims priority from Korean Patent Applications No. 10-2021-0155687 filed on Nov. 12, 2021, and No. 10-2022-0019636 filed on Feb. 15, 2022, in the Korean Intellectual Property Office, the disclosures of which are incorporated herein by reference in their entireties.

BACKGROUND

1. Field of the Disclosure

The present disclosure relates to a storage device.

2. Description of the Related Art

Memory devices represented by solid state drives (SSDs) are widely used not only in traditional electronic devices such as desktop personal computers (PCs), tablet PCs, and laptop PCs, but also in electronic devices related to mobility such as vehicles, drones, and aircraft. Electronic devices may be exposed to various environments. For example, when memory devices are applied to vehicles, the memory devices may receive an impact due to a vibration, a vehicle accident, and the like and, in some cases, may be exposed to a high temperature. An external impact threatens the mechanical reliability of a memory device. A high temperature environment may cause a malfunction of the memory device and shorten a dynamic thermal throttling (DTT) entry time, thereby hindering the normal operation of the memory device.

SUMMARY

Aspects of the present disclosure provide a storage device with improved operational safety.

According to some aspects of the present disclosure, there is provided a storage device comprising a memory module including a memory device, a module board including a memory controller configured to control the memory device, and a memory connector disposed on one side of the module board. A first enclosure is disposed on a first surface of the memory module, and a second enclosure is disposed on a second surface opposite to the first surface of the memory module. A first sensor is disposed on the first enclosure and configured to detect a state and provide a signal for the state to the memory controller. The first enclosure includes a first long side extending in a first direction and a first short side extending in a second direction perpendicular to the first direction. A ratio of the first long side to the first short side ranges from 1.2 to 3.5.

It should be noted that objects of the present disclosure are not limited to the above-described objects, and other objects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, embodiments according to the technical idea of the present disclosure will be described with reference to the accompanying drawings.

Figure 1:
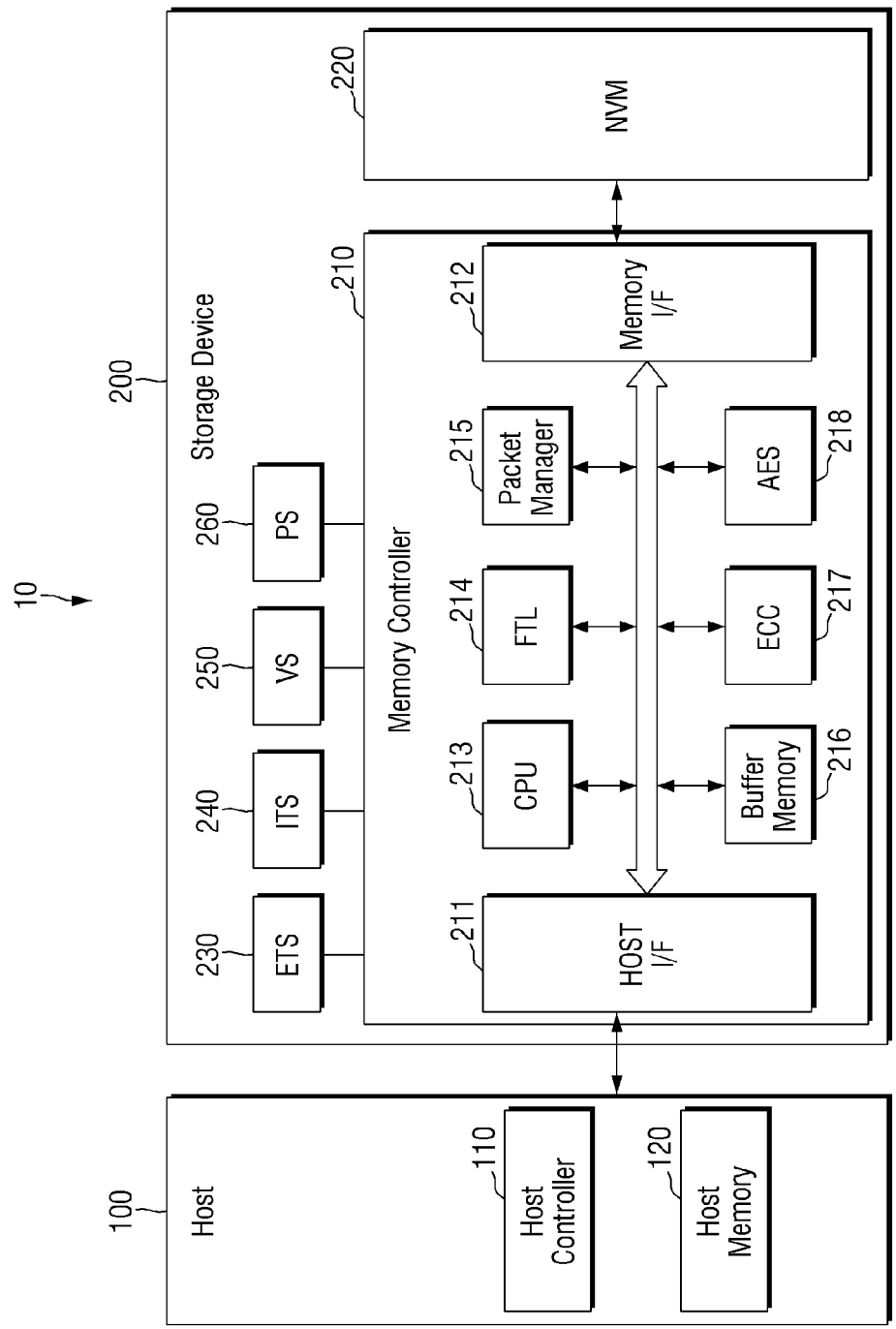
FIG. 1 is a block diagram illustrating a memory system according to some embodiments.

FIG. 1 is a block diagram illustrating a memory system according to some embodiments.

Referring to FIG. 1, a memory system 10 may include a host device 100 and a storage device 200. The host device 100 may include a host controller 110 and a host memory 120. The host memory 120 may serve as a buffer memory for temporarily storing data to be transmitted to the storage device 200 or temporarily storing data transmitted from the storage device 200.

The storage device 200 may include a memory controller 210 and a nonvolatile memory (NVM) device 220. In addition, the storage device 200 may include a sensor for detecting a state of the storage device 200. In this case, the state of the storage device 200 may refer to an external state or an internal state of the storage device 200. The storage device 200 may include a sensor for detecting a state affecting the operation of the storage device 200. For example, the storage device 200 may include an external temperature sensor (ETS) 230, an internal temperature sensor (ITS) 240, a vibration sensor (VS) 250, and a pressure sensor (PS) 260.

The storage device 200 may include storage media for storing data according to a request from the host device 100. For example, the storage device 200 may include at least one among a solid state drive (SSD), an embedded memory, and an attachable/detachable external memory. When the storage device 200 is an SSD, the storage device 200 may be a device conforming to a NVM express (NVMe) standard.

When the storage device 200 is an embedded memory or an external memory, the storage device 200 may be a device conforming to a universal flash storage (UFS) standard or an embedded multi-media card (eMMC) standard. Each of the host device 100 and the storage device 200 may generate and transmit a packet according to an employed standard protocol.

When the NVM device 220 of the storage device 200 includes a flash memory, the flash memory may include a two-dimensional (2D) NAND memory array or a three-dimensional (3D) (or vertical) NAND (VNAND) memory array. As another example, the storage device 200 may include other various types of NVMs. For example, a magnetic random access memory (MRAM), a spin-transfer torque MRAM, a conductive bridging RAM (CBRAM), a ferroelectric RAM (FeRAM), a phase RAM (PRAM), a resistive RAM, or other various types of memories may be applied as the storage device 200.

In some embodiments, the host controller 110 and the host memory 120 may be implemented as separate semiconductor chips. Alternatively, in some embodiments, the host controller 110 and the host memory 120 may be integrated on the same semiconductor chip. As an example, the host controller 110 may be any one among a plurality of modules included in an application processor and the application processor may be implemented as a system on chip (SoC). In addition, the host memory 120 may be an embedded memory included in the application processor or an NVM or a memory module disposed outside the application processor.

The host controller 110 may manage an operation of storing data (e.g., write data) of a buffer region in the NVM device 220 or storing data (e.g., read data) of the NVM device 220 in the buffer region.

The memory controller 210 may include a host interface 211, a memory interface 212, and a central processing unit (CPU) 213. In addition, the memory controller 210 further includes a flash translation layer (FTL) 214, a packet manager 215, a buffer memory device 216, an error correction code (ECC) engine 217, and advanced encryption standard (AES) engine 218.

The memory controller 210 may further include a working memory (not shown) onto which the FTL 214 is loaded, and the CPU 213 executes the FTL 214 to control the operations of writing and reading data to and from the NVM.

The host interface 211 may transmit and receive packets to and from the host device 100. A packet transmitted from the host device 100 to the host interface 211 may include a command or data to be written to the NVM device 220, and a packet transmitted from the host interface 211 to the host device 100 may include a response to the command or data read from the NVM device 220.

The memory interface 212 may transmit data, which is to be written to the NVM device 220, to the NVM device 220 or receive data read from the NVM device 220. The memory interface 212 may be implemented to comply with a toggle protocol or an open NAND flash interface working group (ONFI) protocol.

The FTL 214 may perform various functions such as address mapping, wear-leveling, and garbage collection. The address mapping is an operation of changing a logical address received from the host device 100 into a physical address used to store data in the NVM device 220. The wear-leveling is a technique for allowing blocks in the NVM device 220 to be uniformly used to prevent excessive degradation of a specific block. For example, the wear-leveling may be implemented through a firmware technique which balances erase counts of physical blocks. The garbage collection is a technique for securing usable capacity in the NVM device 220 by copying valid data of a block to a new block and then erasing the existing block.

The packet manager 215 may generate a packet according to a protocol of an interface negotiated with the host device 100 or parse various pieces of information from a packet received from the host device 100. In addition, the buffer memory device 216 may temporarily store data to be written to the NVM device 220 or data to be read from the NVM device 220. The buffer memory device 216 may be a component provided in the memory controller 210 and may be disposed outside the memory controller 210.

The ECC engine 217 may perform a function of detecting and correcting an error on read data which is read from the NVM device 220. More specifically, the ECC engine 217 may generate parity bits for write data to be written to the NVM device 220 and the generated parity bits, together with the write data, may be stored in the NVM device 220. When data is read from the NVM device 220, the ECC engine 217 may correct an error in the read data using the parity bits, together with the read data, read from the NVM device 220 and may output error-corrected read data.

The AES engine 218 may perform at least one of an encryption operation and a decryption operation on data input to the memory controller 210 using a symmetric-key algorithm.

The memory controller 210 may be connected to the ETS 230, the ITS 240, the VS 250, and the PS 260. The memory controller 210 may receive data on an external state from the ETS 230, the ITS 240, the VS 250, and the PS 260. In response to the data on the external state, the memory controller 210 may control the storage device 200 to operate in response to the external state.

The ETS 230 may detect an external temperature state of the storage device 200. The ETS 230 may detect a temperature state affecting the storage device 200. The ETS 230 may measure an external temperature of the storage device 200. Specifically, the ETS 230 may measure an external temperature of an enclosure assembly 123 of FIG. 4 in which the storage device 200 is physically mounted. The ETS 230 may provide data on the measured external temperature to the memory controller 210.

The ITS 240 may detect an internal temperature state of the storage device 200. The ITS 240 may measure an internal temperature of the storage device 200. Specifically, the ITS 240 may measure the internal temperature of the enclosure assembly 123 of FIG. 4 in which the storage device 200 is physically mounted. The ITS 240 may provide data on the measured internal temperature to the memory controller 210.

The VS 250 may detect a vibration state affecting the storage device 200. The VS 250 may detect a vibration. The VS 250 may measure a level of the detected vibration. Specifically, the VS 250 may detect a vibration affecting a case in which the storage device 200 is physically mounted.

The VS 250 may measure a level of a vibration generated inside the storage device 200 or a level of a vibration generated outside the storage device 200. Specifically, the VS 250 may measure a level of a vibration generated inside the enclosure assembly 123 of FIG. 4 in which the storage device 200 is physically mounted. In addition, the VS 250 may measure a level of a vibration generated outside the enclosure assembly 123 of FIG. 4 in which the storage device 200 is physically mounted.

The VS 250 may determine whether the detected vibration level is a vibration level which is generated in an ordinary operation of the storage device 200. The VS 250 may determine whether the detected vibration level is out of a range generated due to the operation of the storage device 200 and is a vibration level in an abnormal range generated due to an external impact. The VS 250 may provide data on the measured vibration level to the memory controller 210.

The PS 260 may detect a pressure state of the storage device 200. The PS 260 may measure a pressure of the storage device 200. Specifically, the PS 260 may measure a pressure affecting the storage device 200.

In response to pieces of data received from the ETS 230, the ITS 240, the VS 250, and the PS 260, the memory controller 210 may control the operation of the storage device 200.

In response to data on the external temperature provided from the ETS 230, the memory controller 210 may determine whether the external temperature corresponds to a risk factor for the storage device 200. When the external temperature measured by the ETS 230 is determined to be a risk factor for the storage device 200, the memory controller 210 may provide the data on the external temperature to the host device 100. For example, when the external temperature measured by the ETS 230 is higher than an upper limit threshold or lower than a lower limit threshold, the memory controller 210 may provide the data on the external temperature to the host device 100 to indicate the risk factor.

Similarly, in response to data on the vibration level provided from the VS 250, the memory controller 210 may determine whether the vibration level is a risk factor for the storage device 200. When the vibration level measured by the VS 250 is determined to be a risk factor for the storage device 200, the VS 250 may provide the data on the vibration level to the host device 100. When the pressure level measured by the PS 260 is detected to be a risk factor for the storage device 200, in response to the data on the pressure level provided from the PS 260, the memory controller 210 may provide the data on the pressure level to the host device 100.

In some embodiments, the memory controller 210 may determine whether a level of the external temperature corresponds to a first level on the basis of the data on the external temperature provided from the ETS 230. In this case, the first level may be preset to have a range in which the external temperature is determined to be a risk factor for the storage device 200. When the level of the external temperature corresponds to the first level, the memory controller 210 may write data stored in the buffer memory device 216 to the NVM device 220 and erase the data stored in the buffer memory device 216.

The memory controller 210 may write the data stored in the buffer memory device 216 to the NVM device 220, erase the data stored in the buffer memory device 216, and then turn the power of the storage device 200 off by itself. The memory controller 210 may turn the power of the storage device 200 off, thereby interrupting an unstable operation of the storage device 200 until the risk factor for the storage device 200 is removed. For example, until the external temperature of the first level, which is determined to be a risk factor, is changed to a stable range outside of the first level, the memory controller 210 may turn the power of the storage device 200 off.

In some embodiments, the memory controller 210 may determine whether the level of the external temperature corresponds to a second level on the basis of the data on the external temperature provided from the ETS 230. In this case, the second level may be preset to a range in which the external temperature is determined to be a risk factor that is higher than the first level. When the external temperature corresponds to the second level, the memory controller 210 may stop a write operation and a read operation on the NVM device 220.

In some embodiments, the memory controller 210 may calculate a difference value between the external temperature and the internal temperature on the basis of the data on the external temperature provided from the ETS 230 and the data on the internal temperature provided from the ITS 240. When the difference value between the external temperature and the internal temperature is greater than or equal to a threshold value, the memory controller 210 may adjust an operating speed of the storage device 200. For example, when the difference value between the external temperature and the internal temperature is greater than or equal to the threshold value, the memory controller 210 may perform a dynamic thermal throttling (DTT) operation of reducing a processing load of the storage device 200.

In some embodiments, the memory controller 210 may model a temperature of the storage device 200 using the data on the external temperature provided from the ETS 230 and the data on the internal temperature provided from the ITS 240. For example, the memory controller 210 may predict a temperature variation of the storage device 200 using the external temperature measured by the ETS 230 and the internal temperature measured by the ITS 240.

In some embodiments, the memory controller 210 may determine whether the detected vibration level falls within a preset range on the basis of the data on the vibration level provided from the VS 250. When the vibration level falls within the preset range, the memory controller 210 may temporarily interrupt the operation of the storage device 200. For example, when the vibration level measured by the VS 250 is within the preset range, the memory controller 210 may temporarily interrupt a write operation on the NVM device 220. In this case, the preset range may correspond to a vibration level which is generated due to an external impact rather than the ordinary operation of the storage device 200.

In some embodiments, when the memory controller 210 continuously receives data on a vibration level falling within another preset range from the VS 250, the memory controller 210 may resume the temporarily interrupted operation of the storage device 200. For example, when the VS 250 detects a vibration level falling within the other preset range for a preset time and continuously provides data on the vibration level to the memory controller 210, the memory controller 210 may resume performing the temporarily interrupted write operation on the NVM device 220.

That is, when the memory controller 210 continuously receives the data on the vibration level falling within the other preset range from the VS 250, the memory controller 210 may not determine the detected vibration to be a risk factor for the storage device 200. When the detected vibration is not a risk factor for the storage device 200, the memory controller 210 may continuously perform the operation of the storage device 200.

When the temporarily interrupted operation of the storage device 200 is resumed, the memory controller 210 may perform the resumed operation in a low speed mode. Even when the detected vibration is not determined to be a risk factor for the storage device 200, the memory controller 210 may resume the operation in the low speed mode. Even though the continuously detected vibration is a risk factor, in order to prepare for a case in which the continuously detected vibration is not determined to be a risk factor due to an error, the memory controller 210 may resume the operation in the low speed mode.

In response to the pieces of data received from the ETS 230, the ITS 240, the VS 250, and the PS 260, the memory controller 210 may turn the power of the storage device 200 off by itself. Specifically, when the ETS 230, the ITS 240, the VS 250, and the PS 260 detect a state of a level affecting the operation of the storage device 200, the memory controller 210 may turn the power of the storage device 200 by itself to block a risk factor.

Figure 2:
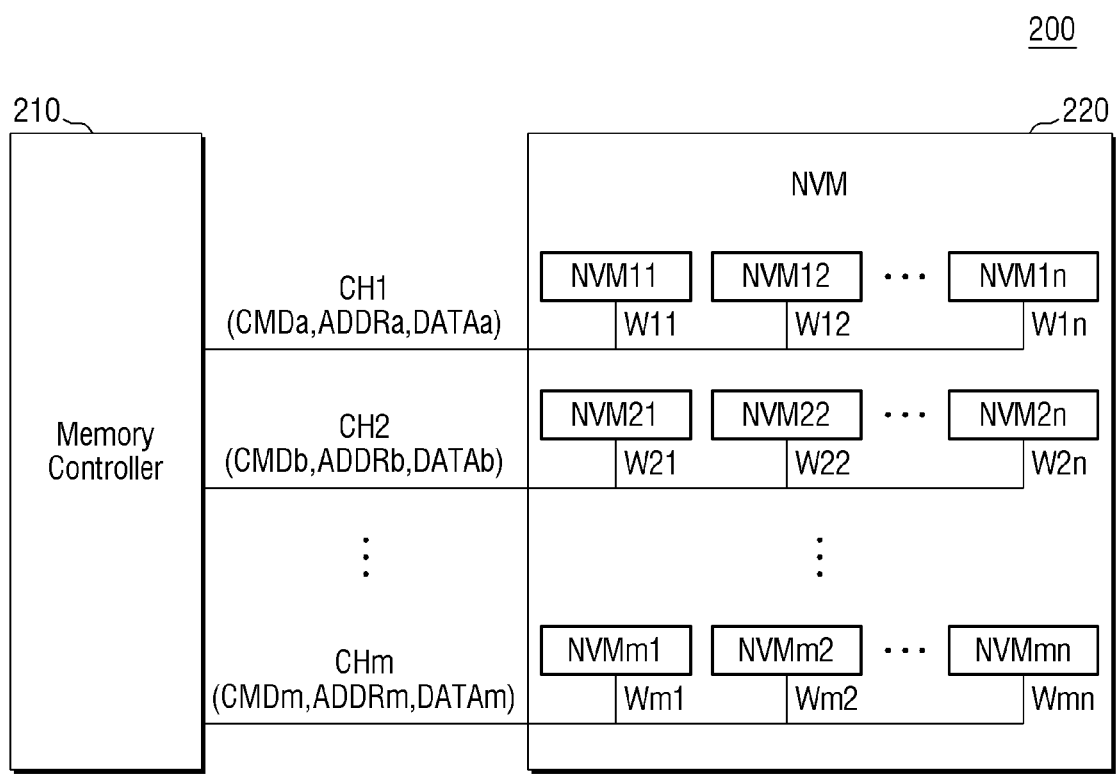
FIG. 2 is a reconfiguration diagram illustrating the memory controller and the NVM device of the storage device of FIG. 1.

FIG. 2 is a reconfiguration diagram illustrating the memory controller and the NVM device of the storage device of FIG. 1.

Referring to FIG. 2, the storage device 200 may include the NVM device 220 and the memory controller 210. The storage device 200 may support a plurality of channels CH1 to CHm, and the NVM device 220 and the memory controller 210 may be connected through the plurality of channels CH1 to CHm. For example, the storage device 200 may be implemented as a storage device such as a solid state drive (SSD).

The NVM device 220 may include a plurality of NVM devices NVM11 to NVMmn. Each of the NVM devices NVM11 to NVMmn may be connected to one of the plurality of channels CH1 to CHm through a corresponding way. For example, the NVM devices NVM11 to NVM1$n$ may be connected to a first channel CH1 through ways W11 to W1$n$, the NVM devices NVM21 to NVM2$n$ may be connected to a second channel CH2 through ways W21 to W2$n$, and the NVM devices NVMm1 to NVMmn may be connected to an $m^{th}$ channel CHm through ways Wm1 to Wmn. In an exemplary embodiment, each of the NVM devices NVM11 to NVMmn may be implemented as an arbitrary memory unit which is operatable according to an individual command from the memory controller 210. For example, each of the NVM devices NVM11 to NVMmn may be implemented as a chip or a die, but the present disclosure is not limited thereto.

The memory controller 210 may transmit and receive signals to and from the NVM device 220 through the plurality of channels CH1 to CHm. For example, the memory controller 210 may transmit commands CMDa to CMDm, addresses ADDRa to ADDRm, and pieces of data DATAa to DATAm to the NVM device 220 through the channels CH1 to Chm and may receive the pieces of data DATAa to DATAm from the NVM device 220.

The memory controller 210 may select one among the NVM devices connected to a corresponding channel through each channel and may transmit and receive signals to and from the selected NVM device. For example, the memory controller 210 may select the NVM device NVM11 from among the NVM devices NVM11 to NVM1$n$ connected to the first channel CH1. The memory controller 210 may transmit a command CMDa, an address ADDRa, and data DATAa to the selected NVM device NVM11 through the first channel CH1 or may receive the data DATAa from the selected NVM device NVM11.

The memory controller 210 may transmit and receive signals to and from the NVM device 220 in parallel through different channels. For example, while the memory controller 210 transmits the command CMDa to the NVM device 220 through the first channel CH1, the memory controller 210 may transmit a command CMDb to the NVM device 220 through a second channel CH2. For example, while the memory controller 210 receives the data DATAa from the NVM device 220 through the first channel CH1, the memory controller 210 may receive data DATAb from the NVM device 220 through the second channel CH2.

The memory controller 210 may control the overall operation of the NVM device 220. The memory controller 210 may transmit signals through the channels CH1 to CHm to control the NVM devices NVM11 to NVMmn connected to the channels CH1 to CHm. For example, the memory controller 210 may transmit the command CMDa and the address ADDRa through the first channel CH1 to control one selected from among the NVM devices NVM11 to NVM1$n$.

Each of the NVM devices NVM11 to NVMmn may operate under the control of the memory controller 210. For example, the NVM device NVM11 may program the data DATAa according to the command CMDa, the address ADDRa, and the data DATAa which are provided through the first channel CH1. For example, a NVM device NVM21 may read the data DATAb according to the command CMDb and the address ADDRb which are provided through the second channel CH2, and the NVM device NVM21 may transmit the read data DATAb to the memory controller 210.

In FIG. 2, although it has been illustrated that the NVM device 220 communicates with the memory controller 210 through m channels and includes n NVM devices corresponding to each channel, the number of channels and the number of NVM devices connected to one channel may be variously changed.

Figure 3:
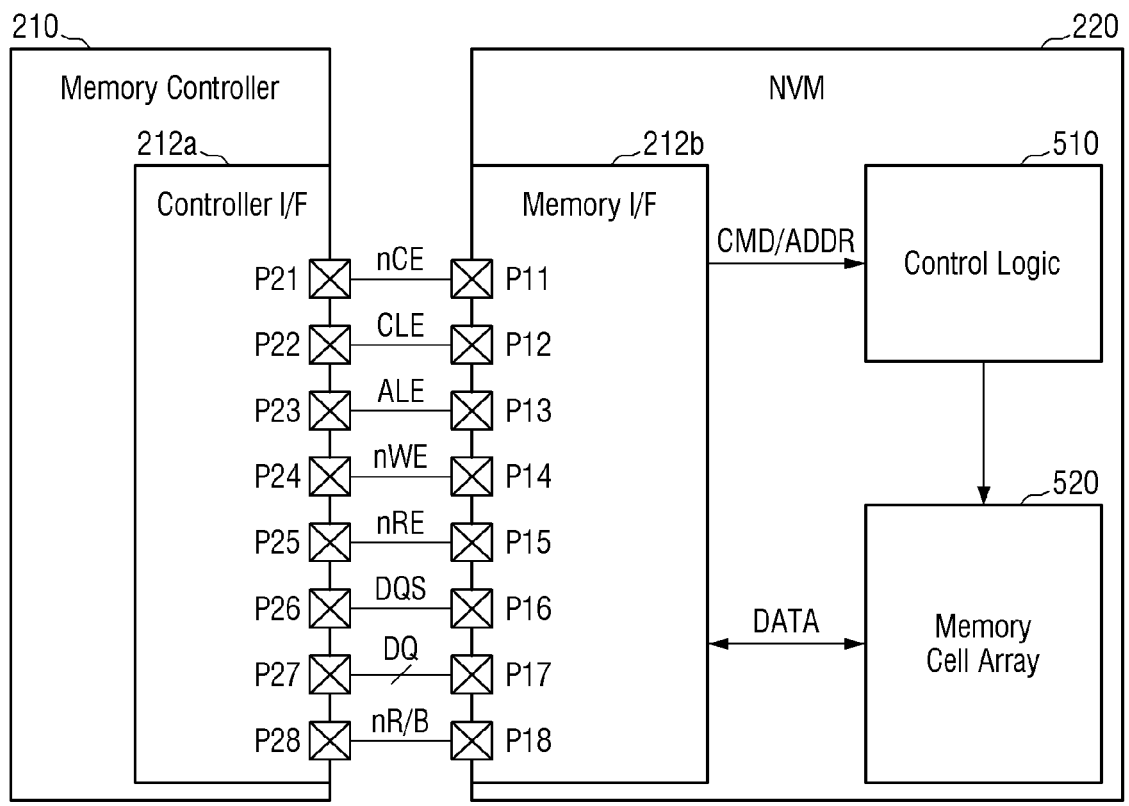
FIG. 3 is a reconfiguration diagram illustrating the memory controller, the memory interface, and the NVM device of FIG. 1.

FIG. 3 is a reconfiguration diagram illustrating the memory controller, the memory interface, and the NVM device of FIG. 1.

Referring to FIG. 3, the NVM device 220 may include first to eighth pins P11 to P18, a memory interface circuit 212$b$, a control logic circuit 510, and a memory cell array 520.

The memory interface circuit 212$b$ may receive a chip enable signal nCE from the memory controller 210 through the first pin P11. The memory interface circuit 212$b$ may transmit and receive signals to and from the memory controller 210 through the second to eighth pins P12 to P18 according to the chip enable signal nCE. For example, when the chip enable signal nCE is in an enable state (e.g., a low level), the memory interface circuit 212$b$ may transmit and receive signals to and from the memory controller 210 through the second to eighth pins P12 to P18.

The memory interface circuit 212$b$ may receive a command latch enable signal CLE, an address latch enable signal ALE, and a write enable signal nWE from the memory controller 210 through the second to fourth pins P12 to P14. The memory interface circuit 212$b$ may receive a data signal DQ from the memory controller 210 through a seventh pin P17 or may transmit the data signal DQ to the memory controller 210. A command CMD, an address ADDR, and data DATA may be transmitted through the data signal DQ. For example, the data signal DQ may be transmitted through a plurality of data signal lines. In this case, the seventh pin P17 may include a plurality of pins corresponding to a plurality of data signals.

The memory interface circuit 212$b$ may acquire the command CMD from the data signal DQ received in an enable period of the command latch enable signal CLE (e.g., a high level state) on the basis of toggle timings of the write enable signal nWE. The memory interface circuit 212$b$ may acquire the address ADDR from the data signal DQ received in an enable period of the address latch enable signal ALE (e.g., a high level state) on the basis of the toggle timings of the write enable signal nWE.

In some embodiments, the write enable signal nWE may maintain a static state (e.g., a high level or a low level) and then may be toggled between the high level and the low level. For example, the write enable signal nWE may be toggled in a period in which the command CMD or the address ADDR is transmitted. Accordingly, the memory interface circuit 212b may acquire the command CMD or the address ADDR on the basis of the toggle timings of the write enable signal nWE.

The memory interface circuit 212b may receive a read enable signal nRE from the memory controller 210 through the fifth pin P15. The memory interface circuit 212b may receive a data strobe signal DQS from the memory controller 210 through a sixth pin P16 or may transmit the data strobe signal DQS to the memory controller 210.

In a data DATA output operation of the NVM device 220, the memory interface circuit 212b may receive the read enable signal nRE which is toggled through the fifth pin P15 before outputting the data DATA. The memory interface circuit 212b may generate a data strobe signal DQS which is toggled on the basis of the toggling of the read enable signal nRE. For example, the memory interface circuit 212b may generate a data strobe signal DQS which starts to be toggled after a predetermined delay (e.g., tDQSRE) on the basis of a toggling start time of the read enable signal nRE. The memory interface circuit 212b may transmit the data signal DQ including the data DATA on the basis of a toggle timing of the data strobe signal DQS. Accordingly, the data DATA may be aligned with the toggle timing of the data strobe signal DQS and transmitted to the memory controller 210.

In a data DATA input operation of the NVM device 220, when the data signal DQ including the data DATA is received from the memory controller 210, the memory interface circuit 212b may receive a data strobe signal DQS, which is toggled together with the data DATA, from the memory controller 210. The memory interface circuit 212b may acquire the data DATA from the data signal DQ on the basis of the toggle timing of the data strobe signal DQS. For example, the memory interface circuit 212b may sample the data signal DQ at a rising edge and a falling edge of the data strobe signal DQS to acquire the data DATA.

The memory interface circuit 212b may transmit a ready/busy output signal nR/B to the memory controller 210 through the eighth pin P18. The memory interface circuit 212b may transmit state information of the NVM device 220 to the memory controller 210 through the ready/busy output signal nR/B. When the NVM device 220 is in a busy state (i.e., when internal operations of the NVM device 220 are being performed), the memory interface circuit 212b may transmit a ready/busy output signal nR/B indicating the busy state to the memory controller 210. When the NVM device 220 is in a ready state (i.e., when internal operations of the NVM device 220 are not performed or are completed), the memory interface circuit 212b may transmit a ready/busy output signal nR/B indicating the ready state to the memory controller 210.

For example, while the NVM device 220 reads the data DATA from the memory cell array 520 in response to a page read command, the memory interface circuit 212b may transmit the ready/busy output signal nR/B indicating the busy state (e.g., a low level) to the memory controller 210. For example, while the NVM device 220 programs the data DATA into the memory cell array 520 in response to a program command, the memory interface circuit 212b may transmit the ready/busy output signal nR/B indicating the busy state to the memory controller 210.

The control logic circuit 510 may generally control various operations of the NVM device 220. The control logic circuit 510 may receive a command/address CMD/ADDR acquired from the memory interface circuit 212b. The control logic circuit 510 may generate control signals for controlling other components of the NVM device 220 according to the received command/address CMD/ADDR. For example, the control logic circuit 510 may generate various control signals for programming the data DATA into the memory cell array 520 or for reading the data DATA from the memory cell array 520.

The memory cell array 520 may store the data DATA acquired from the memory interface circuit 212b under the control of the control logic circuit 510. The memory cell array 520 may output the stored data DATA to the memory interface circuit 212b under the control of the control logic circuit 510.

The memory cell array 520 may include a plurality of memory cells. For example, the plurality of memory cells may be flash memory cells. However, the present disclosure is not limited thereto and the memory cells may include RRAM cells, FeRAM cells, PRAM cells, a thyristor RAM (TRAM) cells, and MRAM cells. Hereinafter, embodiments of the present disclosure will be described focusing on an embodiment in which the memory cells are NAND flash memory cells.

The memory controller 210 may include first to eighth pins P21 to P28 and a controller interface circuit 212a. The first to eighth pins P21 to P28 may correspond to the first to eighth pins P11 to P18 of the NVM device 220.

The controller interface circuit 212a may transmit a chip enable signal nCE to the NVM device 220 through the first pin P21. The controller interface circuit 212a may transmit and receive signals to and from the NVM device 220, which is selected through the chip enable signal nCE, through the second to eighth pins P22 to P28.

The controller interface circuit 212a may transmit a command latch enable signal CLE, an address latch enable signal ALE, and a write enable signal nWE to the NVM device 220 through the second to fourth pins P22 to P24. The controller interface circuit 212a may transmit a data signal DQ to the NVM device 220 or receive a data signal DQ from the NVM device 220 through the seventh pin P27.

The controller interface circuit 212a may transmit a data signal DQ including a command CMD or an address ADDR, together with the write enable signal nWE that is togglable, to the NVM device 220. As the controller interface circuit 212a transmits the command latch enable signal CLE in an enable state, the controller interface circuit 212a may transmit the data signal DQ including the command CMD to the NVM device 220, and as the controller interface circuit 212a transmits the address latch enable signal ALE in an enable state, the controller interface circuit 212a may transmit the data signal DQ including the address ADDR to the NVM device 220.

The controller interface circuit 212a may transmit a read enable signal nRE to the NVM device 220 through the fifth pin P25. The controller interface circuit 212a may receive a data strobe signal DQS from the NVM device 220 through the sixth pin P26 or may transmit a data strobe signal DQS to the NVM device 220.

In the data DATA output operation of the NVM device 220, the controller interface circuit 212a may generate a read enable signal nRE that is togglable and transmit the read enable signal nRE to the NVM device 220. For example, the controller interface circuit 212a may generate a read enable signal nRE which is changed from a static state (e.g., a high level or a low level) to a toggled state before the data DATA is output. Accordingly, the NVM device 220 may generate the data strobe signal DQS which is toggled on the basis of the read enable signal nRE. The controller interface circuit 212a may receive the data signal DQ including the data DATA together with the data strobe signal DQS that is togglable from the NVM device 220. The controller interface circuit 212a may acquire the data DATA from the data signal DQ on the basis of the toggle timing of the data strobe signal DQS.

In the data DATA input operation of the NVM device 220, the controller interface circuit 212a may generate the data strobe signal DQS that is togglable. For example, the controller interface circuit 212a may generate a data strobe signal DQS which is changed from a static state (e.g., a high level or a low level) to a toggled state before the data DATA is transmitted. The controller interface circuit 212a may transmit the data signal DQ including the data DATA to the NVM device 220 on the basis of toggle timings of the data strobe signal DQS.

The controller interface circuit 212a may receive a ready/busy output signal nR/B from the NVM device 220 through the eighth pin P28. The controller interface circuit 212a may determine state information of the NVM device 220 on the basis of the ready/busy output signal nR/B.

The storage device 200 described with reference to FIGS. 1 to 3 may be embedded in or installed inside various electronic devices. The electronic devices are devices including electronic equipment or electronic components and may include, for example, desktop personal computers (PCs), tablet PCs, laptop PCs, netbook computers, workstations, servers, personal digital assistants (PDAs), mobile phones, smart phones, video phones, e-book readers, moving picture experts group layer 3 (MP3) players, digital cameras, televisions, projectors, game consoles, navigation devices, robots, global navigation satellite systems (GNSSs), medical devices including electronic equipment, washing machines, and refrigerators. In addition, vehicles, drones, aircraft, ships, and satellites may be referred to as electronic devices as long as they include electronic equipment or electronic components.

Figure 4:
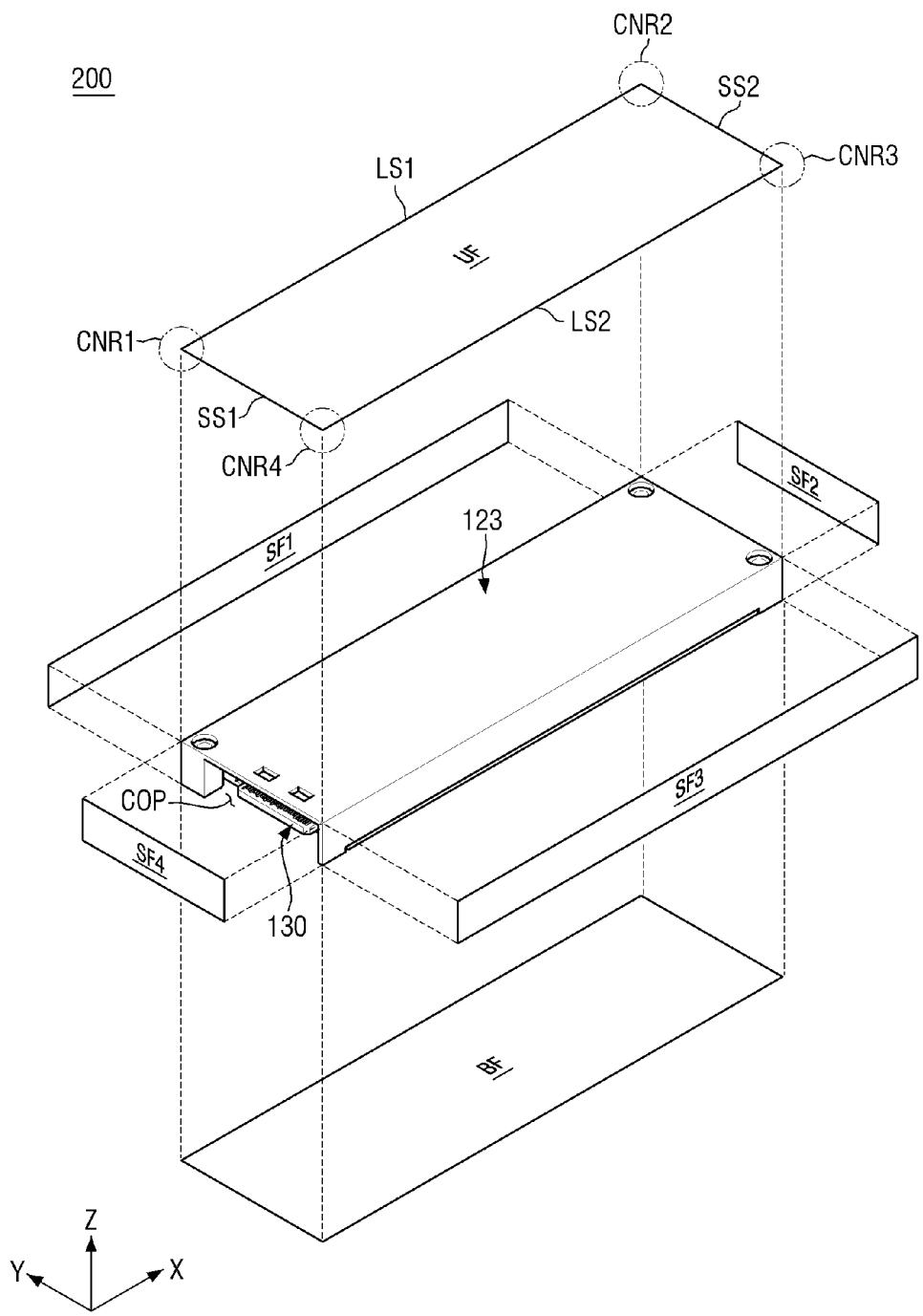
FIG. 4 is a perspective view illustrating a storage device according to some embodiments.
Figure 5:
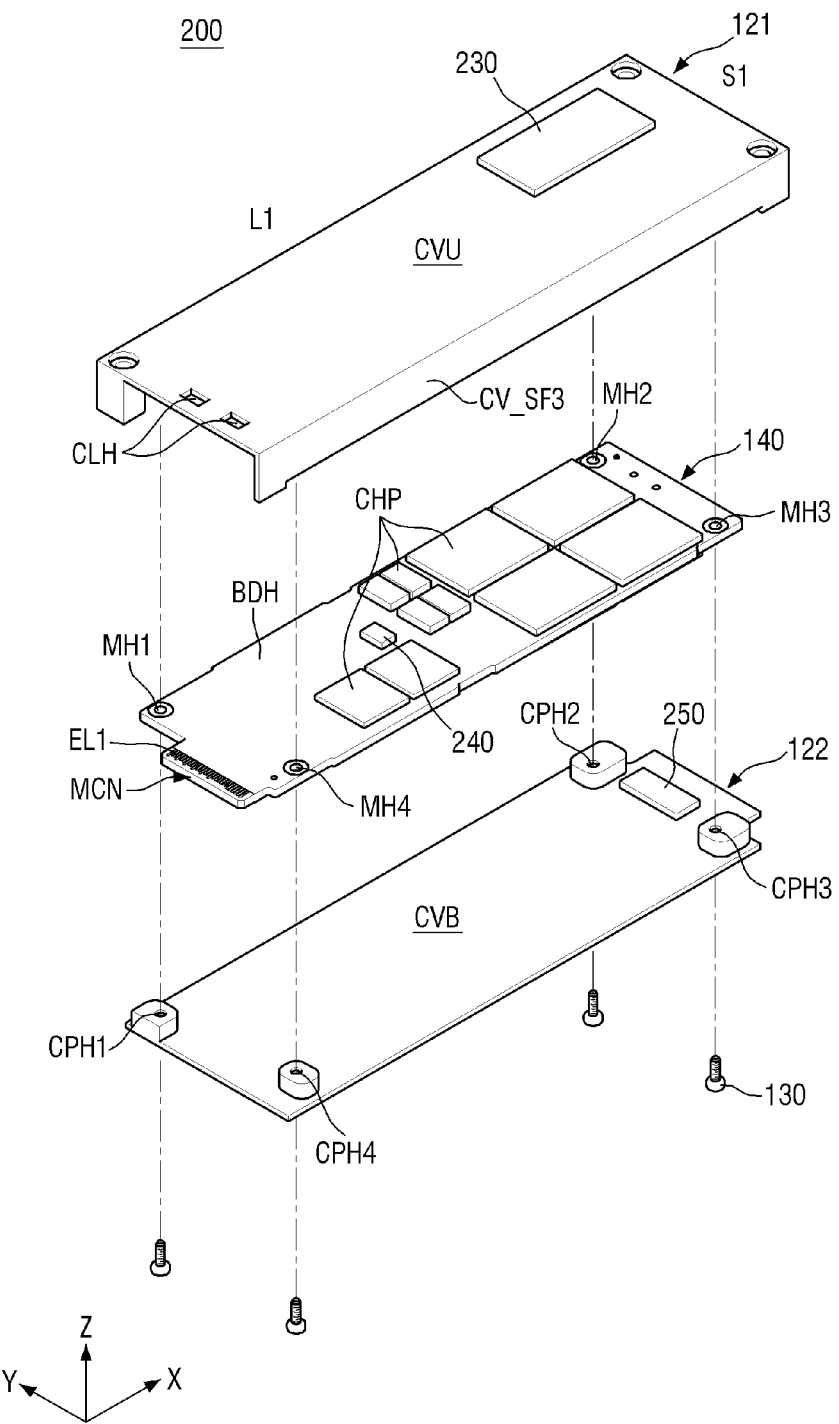
FIG. 5 is an exploded perspective view illustrating the storage device according to some embodiments.
Figure 6:
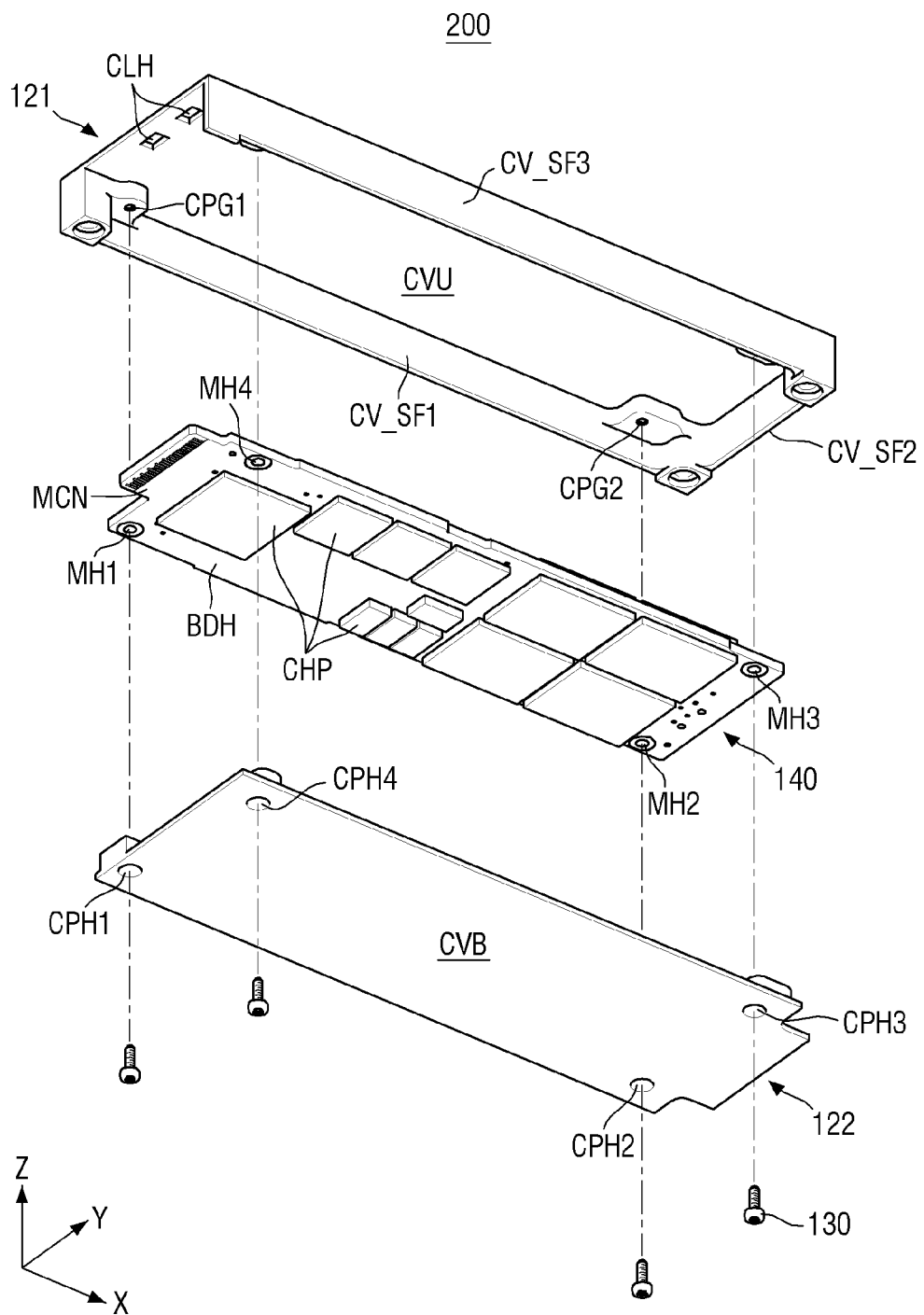
FIG. 6 is an exploded perspective view illustrating the storage device according to some embodiments when viewed from a direction different from the viewing direction of FIG. 5.
Figure 7:
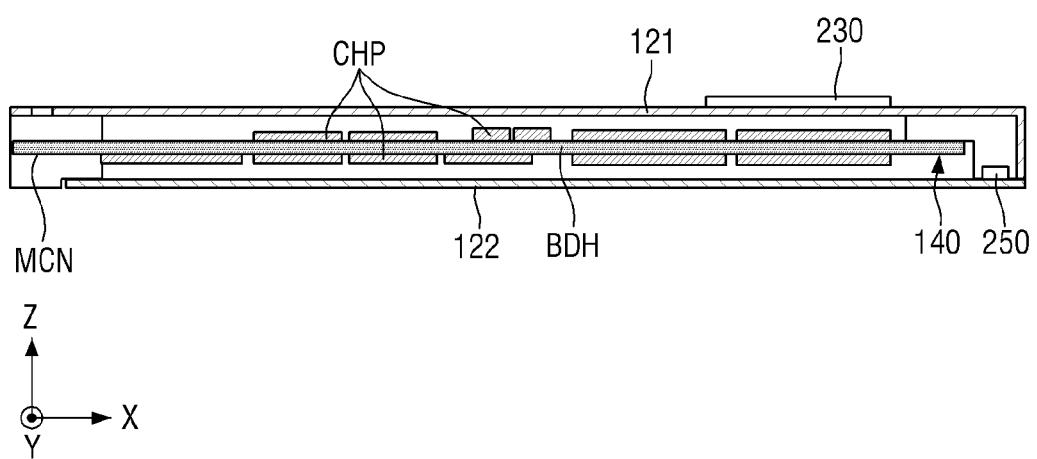
FIG. 7 is a cross-sectional view taken in a first direction of the storage device of FIG. 4.

FIG. 4 is a perspective view illustrating a storage device according to some embodiments. FIG. 5 is an exploded perspective view illustrating the storage device according to some embodiments. FIG. 6 is an exploded perspective view illustrating the storage device according to some embodiments when viewed from a direction different from the viewing direction of FIG. 5. FIG. 7 is a cross-sectional view taken in a first direction of the storage device of FIG. 4. FIGS. 8 to 11 are schematic views for describing a first enclosure of the storage device according to some embodiments. FIG. 12 is a plan view illustrating a memory module according to some embodiments.

Referring to FIG. 4, an exterior of the storage device 200 may have a substantially rectangular parallelepiped shape. When a surface having the largest area in the rectangular parallelepiped is defined as a bottom surface BF, a bottom surface BF of the storage device 200 may have a rectangular shape. The rectangular shape includes a first long side LS1 and a second long side LS2 facing each other, and a first short side SS1 and a second short side SS2 facing each other. In the present specification, portions where sides meet in the rectangular shape are referred to as corner portions CNR1 to CNR4. Specifically, a portion where the first long side LS1 and the first short side SS1 meet is referred to as a first corner portion CNR1, a portion where the first long side LS1 and the second short side SS2 meet is referred to as a second corner portion CNR2, a portion where the second short side SS2 and the second long side LS2 meet is referred to as a third corner portion CNR3, and a portion where the second long side LS2 and the first short side SS1 meet is referred to as a fourth corner portion CNR4.

In the drawings, an extension direction of a long side of a rectangular-shaped bottom surface denotes a first direction X, an extension direction of a short side thereof denotes a second direction Y, and a thickness direction of the rectangular parallelepiped denotes a third direction Z. Planes defined by two directions may be referred to as an XY plane, an YZ plane, and a ZX plane. According to the above criteria, the bottom surface of the storage device 200 lies on the XY plane. Unless otherwise specified herein, a planar shape of a specific member or an exterior on a plan view refers to a shape in which the specific member lies on the XY plane.

For convenience of description, a surface located on one side of the third direction Z (an upper side in the drawing) of two bottom surfaces of the storage device 200 may be referred to as an upper surface UF, and a surface located on the other side (a lower side in the drawing) of the third direction Z may be referred to as the bottom surface BF. For other constituent members, when a constituent member is located on one side based on the third direction Z, the constituent member may be referred to as an upper surface UF, and when a constituent member is located on the other side, the constituent member may be referred to as a bottom surface BF. However, in the upper surface UF and the bottom surface BF, "upper" and "bottom" distinguish only relative positions of the upper surface UF and the bottom surface BF, and even when the upper surface UF and the bottom surface BF are referred to as "upper" and "bottom," it is obvious that "upper" and "bottom" may be turned upside down and may be located in a left-right direction or a diagonal direction according to reorientation of the storage device 200.

The rectangular parallelepiped shape includes four side surfaces SF1 to SF4 connecting the upper surface UF to the bottom surface BF. In the present specification, four side surfaces of the rectangular parallelepiped may be distinctively referred to as a first side SF1 connected to the first long side LS1 of the bottom surface in a plan view, a second side SF2 connected to the second short side SS2, a third side SF3 connected to the second long side LS2, and a fourth side SF4 connected to the first short side SS1. The upper surface UF and the bottom surface BF of a rectangular parallelepiped shape may lie on the XY plane, the first side SF1 and the third side SF3 may lie on the XZ plane, and the second side SF2 and the fourth side SF4 may lie on the YZ plane. The above-described definitions for the directions, the planes, and the like will be commonly used throughout the present specification even when not indicated in the cited drawings.

The exterior of the storage device 200 may conform to a standardized or arbitrary form factor. The dimensions of the storage device 200 having a rectangular parallelepiped shape may also be changed according to various standards. A ratio of the long side to the short side of the storage device 200 may range from 1.2 to 3.5. When the ratio of the long side to the short side of the storage device 200 ranges from 1.2 to 3.5, electronic devices CHP may be efficiently disposed in a memory module 140. When the ratio of the long side to the short side of the storage device 200 ranges from 1.2 to 3.5, mountability of the electronic device CHP may be improved.

In the storage device 200, a length of the long side may be greater than or equal to 100 mm and a length of the short side may be less than or equal to 40 mm. In an example, the storage device 200 may conform to a long-type dimension standard in which a length of the long side (a width in the first direction X) is 119 mm, a length of the short side (a width in the second direction Y) is 36.5 mm, and a height (a width of the third direction Z) is 9.5 mm. The dimension standard may allow a tolerance within 5% of each dimension. For example, the dimension standard may allow tolerances of ±0.25 mm, ±0.35 mm, and ±0.45 mm.

In the long-type storage device 200, a length of a long side may range from 118.75 mm to 119.35 mm. In the long-type storage device 200, a length of a short side may range from 36.15 mm to 36.85 mm. In the long-type storage device 200, a height may range from 9.05 mm to 9.95 mm.

A ratio of the long side to the short side of the long-type storage device 200 may range from 3.1 to 3.5.

In the storage device 200, a length of the long side may be less than 100 mm and a length of the short side may be less than 40 mm. In another example, the storage device 200 may conform to a short-type dimension standard in which a length of the long side (a width in the first direction X) is 52 mm, a length of the short side (a width in the second direction Y) is 36.5 mm, and a height (a width of the third direction Z) is 9.5 mm. For example, the dimension standard may allow tolerances of ±0.25 mm, ±0.35 mm, and ±0.45 mm.

In the short-type storage device 200, a length of a long side may range from 51.25 mm to 53.25 mm. In the short-type storage device 200, a length of a short side may range from 36.15 mm to 36.85 mm. In the short-type storage device 200, a height may range from 9.05 mm to 9.95 mm.

A ratio of the long side to the short side of the short-type storage device 200 may range from 1.2 to 1.6.

Hereinafter, an example case in which the storage device 200 mainly has a long-type dimension standard will be described, but the technical idea of the embodiments may be modified and applied to a short-type dimension standard or other various dimension standards.

Referring to FIGS. 4 to 7, the storage device 200 includes the memory module 140 and the enclosure assembly 123 which accommodates the memory module 140. The enclosure assembly 123 may substantially define the exterior of the storage device 200. The memory module 140 may be covered by the enclosure assembly 123, excluding a portion of an area where a memory connector MCN is located. The enclosure assembly 123 generally has a rectangular parallelepiped shape of which an inside is empty. The memory module 140 is accommodated inside the enclosure assembly 123. The enclosure assembly 123 may serve as a housing.

The exterior of the enclosure assembly 123 may include an upper surface UF, a bottom surface BF, and three side surfaces SF1, SF2, and SF3. The upper surface UF and the bottom surface BF of the enclosure assembly 123 may constitute the upper surface UF and the bottom surface BF of the storage device 200, and the three side surfaces SF1, SF2, and SF3 may constitute the first side surface SF1, the second side surface SF2, and the third side surface SF3 of the storage device 200. At a position corresponding to the fourth side SF4 of the storage device 200, the enclosure assembly 123 may include a connector opening COP exposing the memory connector MCN in the first direction X.

The enclosure assembly 123 may be provided by assembling a plurality of parts. Specifically, the enclosure assembly 123 may include a first enclosure 121 located in an upper portion and a second enclosure 122 disposed in a lower portion. The first enclosure 121 and the second enclosure 122 may be mutually fastened to define a space which is at least partially sealed. The memory module 140 may be accommodated in the sealed space.

The first enclosure 121 and the second enclosure 122 may be connected through a fastening part. The first enclosure 121 and the second enclosure 122 may be coupled through the fastening part. Specifically, the fastening part may include coupling grooves CPG1 to CPG4 (CPG3 and CPG4 not shown) of the first enclosure 121 and coupling holes CPH1 to CPH4 of the second enclosure 122.

The first enclosure 121 and the second enclosure 122 are each made of a metal, such as stainless steel, aluminum (Al), copper (Cu), titanium (Ti), nickel (Ni), or an alloy including Al, Cu, Ti, and Ni or made of a polymer material, a carbon-based material, or a composite material in which the polymer material and the carbon-based material are mixed.

In some embodiments, the first enclosure 121 and second enclosure 122 may each include a thermal interface material (TIM), a phase change material (PCM), or an encapsulated PCM (ePCM). The above materials may be mixed with the constituent materials of the first enclosure 121 and the second enclosure 122, applied on inner surfaces of the first enclosure 121 and the second enclosure 122 (the bottom surface BF of the first enclosure 121 and the upper surface UF of the second enclosure 122) or applied on both surfaces thereof, manufactured as separate films, and attached to the inner surfaces or both side surfaces of the first enclosure 121 and the second enclosure 122. The TIM and the like may help the first enclosure 121 and the second enclosure 122 to absorb, store, or distribute heat. Consequently, it is possible to increase the heat capacity of the enclosure assembly 123 and the storage device 200 including the enclosure assembly 123.

The first enclosure 121 and the second enclosure 122 may be made of the same material or different materials.

The first enclosure 121 and the second enclosure 122 may each include a bottom cover corresponding to the bottom surface of the enclosure assembly 123. At least one of the first enclosure 121 and the second enclosure 122 may further include a side cover corresponding to the side surface of the enclosure assembly 123. In the drawings, although an example case in which the first enclosure 121 includes a bottom cover and a plurality of side covers is illustrated and described below, the plurality of side covers may be included in the second enclosure 122. In addition, some of the side covers may be included in the first enclosure 121 and the remaining covers may be included in the second enclosure 122.

Referring to FIGS. 4 to 7, the first enclosure 121 includes an upper main cover CVU, which is a cover of the upper surface UF, and a plurality of side covers CV_SF1, CV_SF2, and CV_SF3.

The upper main cover CVU lies on the XY plane. The upper main cover CVU may have a uniform thickness.

The upper main cover CVU may have a substantially rectangular shape in a plan view. A planar shape of the CVU may be substantially the same as a planar shape of the storage device 200. The lengths of the long side and the short side of the storage device 200 may be determined by lengths of a long side and a short side of the upper main cover CVU.

The upper main cover CVU may cover a module board BDH of the memory module 140 and the memory connector MCN of the memory module 140. The first short side SS1 of the upper main cover CVU may be aligned with an end portion of the memory connector MCN or disposed outside the end portion thereof.

The plurality of side covers CV_SF1, CV_SF2, and CV_SF3 may be integrally formed by being connected to the upper main cover CVU. The plurality of side covers CV_SF1, CV_SF2, and CV_SF3 may include a first side cover CV_SF1 bent from the first long side LS1 of the upper main cover CVU, a second side cover CV_SF2 bent from the second short side SS2, and a third side cover CV_SF3 bent from the second long side LS2. A side cover may not be disposed at the first short side SS1 of the upper main cover CVU so as to define the connector opening COP. The side covers CV_SF1, CV_SF2, and CV_SF3 may be integrally connected.

The side covers CV_SF1, CV_SF2, and CV_SF3 may have the same thickness and may have the same thickness as the upper main cover CVU, but the present disclosure is not limited thereto.

The side covers CV_SF1, CV_SF2, and CV_SF3 may each have a height corresponding to a height of the storage device 200. In the assembled storage device 200 according to the exemplary embodiment, end portions of the side covers CV_SF1, CV_SF2, and CV_SF3 lie on an upper surface UF, which is a bottom cover, of a bottom main cover CVB of the second enclosure 122. In this case, the height of the storage device 200 may correspond to the sum of the height of the side cover and a thickness of the bottom main cover CVB. The heights of the first side cover CV_SF1, the second side cover CV_SF2, and the third side cover CV_SF3 may generally be the same.

In FIG. 6, although it is illustrated that the second side cover CV_SF2 is included, the embodiment is not limited thereto. For example, a side cover may not be disposed at the second short side SS2 of the upper main cover CVU.

The first enclosure 121 may include coupling grooves CPG1 to CPG4 (CPG3 and CPG4 not shown) which are spatially connected to and fastened to module fastening holes MH1 to MH4 by module screws 130. The coupling grooves CPG1 to CPG4 of the first enclosure 121 may be disposed in the same number as the module fastening holes MH1 to MH4. The coupling grooves CPG1 to CPG4 of the first enclosure 121 may overlap corresponding module fastening holes MH1 to MH4. Planar shapes of the coupling grooves CPG1 to CPG4 of the first enclosure 121 may be the same as those of the module fastening holes MH1 to MH4, but the present disclosure is not limited thereto.

The first enclosure 121 may further include at least one clamping hole CLH passing through the upper main cover CVU. When connected to the host connector, the clamping hole CLH provides a space in which a hook of the host connector is inserted. The clamping hole CLH may be disposed adjacent to the first short side SS1 of the upper main cover CVU.

The clamping hole CLH may be disposed at a position overlapping the memory connector MCN. The clamping hole CLH may have a rectangular shape with a long side in the second direction Y in a plan view. A width of the clamping hole CLH in the second direction Y may be 4.0 mm, and a width thereof in the first direction X may be 2.5 mm.

The number of clamping holes CLH may correspond to the number of hooks of the host connector. When the host connector includes two hooks, the number of clamping holes CLH may also be two. The two clamping holes CLH may be disposed in the second direction Y. One clamping hole CLH may be disposed apart from the second long side LS2 of the upper main cover CVU by 7.25 mm, and the other clamping hole CLH may be disposed apart therefrom by 16.25 mm. An interval between the clamping holes CLH may be 5.0 mm.

An external temperature sensor 230 may be disposed on an outer surface of the first enclosure 121. The outer surface of the first enclosure 121 may refer to a surface opposite to an inner surface of the first enclosure 121 facing the memory module 140. That is, the external temperature sensor 230 may be disposed outside the enclosure assembly 123 in which the memory module 140 is mounted.

The external temperature sensor 230 may transmit data on a measured external temperature to the memory controller 210 disposed in the memory module 140. The external temperature sensor 230 may be connected to the memory controller 210 in a wired manner. Alternatively, the external temperature sensor 230 may be connected to the memory controller 210 in a wireless manner. In this case, the external temperature sensor 230 may include an antenna for transmitting and receiving data to and from the memory controller 210.

The second enclosure 122 includes the bottom main cover CVB which is a bottom cover. The bottom main cover CVB lies on the XY plane. The bottom main cover CVB may have the same thickness as the upper main cover CVU, but the present disclosure is not limited thereto.

The bottom main cover CVB may have an area that is smaller than an area of the upper main cover CVU. The bottom main cover CVB may cover an entirety of the module board BDH of the memory module 140 from the bottom and may expose the memory connector MCN without covering the memory connector MCN. A first short side SS1 of the bottom main cover CVB may be located more inward than the first short side SS1 of the upper main cover CVU and located more inward than an end portion of the memory connector MCN. The first short side SS1 of the upper main cover CVU may be aligned with a first short side SS1 of the module board BDH, but the present disclosure is not limited thereto.

The second enclosure 122 may include the coupling holes CPH1 to CPH4 which are spatially connected to and fastened to the module fastening holes MH1 to MH4 by the module screws 130. The coupling holes CPH1 to CPH4 of the second enclosure 122 may be disposed in the same number as the module fastening holes MH1 to MH4. The coupling holes CPH1 to CPH4 of the second enclosure 122 may overlap the corresponding module fastening holes MH1 to MH4 and the coupling grooves CPG1 to CPG4 of the first enclosure 121. Planar shapes of the coupling holes CPH1 to CPH4 of the second enclosure 122 may be the same as those of the module fastening holes MH1 to MH4, but the present disclosure is not limited thereto.

The VS 250 may be disposed on an inner surface of the second enclosure 122. The inner surface of the second enclosure 122 may refer to a surface facing the memory module 140. The VS 250 may be disposed inside the enclosure assembly 123. The VS 250 may be disposed at an edge of the second enclosure 122. For example, as shown in FIG. 5, the VS 250 may be disposed between the second coupling hole CPH2 and the third coupling hole CPH3. As another example, the VS 250 may be disposed between the first coupling hole CPH1 and the fourth coupling hole CPH4. In this case, the VS 250 may be disposed at a position not interfering with the physical coupling of the storage device 200 and an external device. For example, the VS 250 may be disposed at a position not interfering with the connection of the host connector to the storage device 200 through the clamping hole CLH.

The VS 250 may transmit data on the measured vibration to the memory controller 210 disposed in the memory module 140. For example, the VS 250 may transmit data on a measured vibration level to the memory controller 210. The VS 250 may be connected to the memory controller 210 in a wired manner. Alternatively, the VS 250 may be connected to the memory controller 210 in a wireless manner. In this case, the VS 250 may include an antenna for transmitting and receiving data to and from the memory controller 210.

In FIGS. 5 and 7, although it is illustrated that the VS 250 is disposed on the inner surface of the second enclosure 122, the embodiment is not limited thereto. For example, the VS 250 may be disposed on an outer surface of the second enclosure 122.

The first enclosure 121, the memory module 140, and the second enclosure 122 may be mutually fastened by the module screws 130. The module screws 130 sequentially pass through the coupling holes CPH1 to CPH4 of the second enclosure 122 and the module fastening holes MH1 to MH4 from the bottom surface BF of the second enclosure 122 and are inserted into the coupling grooves CPG1 to CPG4 of the first enclosure 121, thereby fastening the second enclosure 122 to the first enclosure 121. To facilitate the fastening due to the module screws 130, screw threads rotating in the same orientation may be disposed on inner walls of the coupling holes CPH1 to CPH4 of the second enclosure 122, the module fastening holes MH1 to MH4, and/or the coupling grooves CPG1 to CPG4 of the first enclosure 121.

The enclosure assembly 123 may be made of a material for protecting the storage device 200 from an external temperature. In some embodiments, the enclosure assembly 123 may be formed in a vacuum state to reduce an influence of an external temperature on the storage device 200. In some embodiments, the enclosure assembly 123 may include a refrigerant material to reduce the influence of an external temperature on the storage device 200. In this regard, a description will be made in detail with reference to FIGS. 8 to 11.

Figure 8:
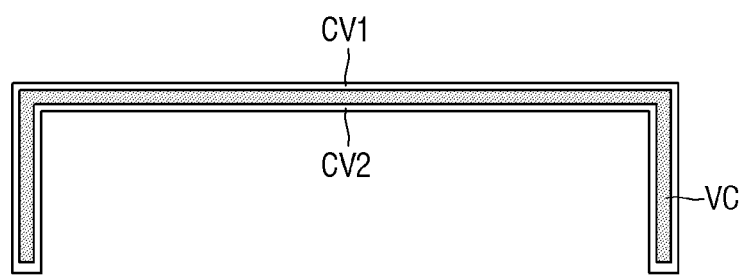
FIGS. 8 to 11 are schematic views for describing a first enclosure of the storage device according to some embodiments.
Figure 8:
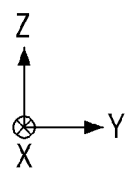

Referring to FIGS. 5, 6, and 8, the first enclosure 121 may include a first cover layer CV1 and a second cover layer CV2. The first cover layer CV1 and the second cover layer CV2 may define an exterior shape of the first enclosure 121. The first cover layer CV1 may be disposed above the second cover layer CV2. The first cover layer CV1 and the second cover layer CV2 may be connected with a vacuum layer VC interposed therebetween.

The first cover layer CV1 may define the outer surface of the first enclosure 121. That is, the first cover layer CV1 may include a surface not facing the memory module 140. The second cover layer CV2 may define the inner surface of the second enclosure 122. That is, the second cover layer CV2 may include a surface facing the memory module 140.

The first enclosure 121 may include a space between the first cover layer CV1 and the second cover layer CV2. The space between the first cover layer CV1 and the second cover layer CV2 may be in a vacuum state. That is, the first enclosure 121 may include the vacuum layer VC, which does not include a specific material, between the first cover layer CV1 and the second cover layer CV2.

Since the space between the first cover layer CV1 and the second cover layer CV2 is in a vacuum state, the first enclosure 121 may not effectively transfer heat due to a temperature outside the first enclosure 121 to the inside of the first enclosure 121. Accordingly, the first enclosure 121 including the vacuum layer VC may reduce the influence of an external temperature on the memory module 140 mounted inside the first enclosure 121. That is, the vacuum layer VC of the first enclosure 121 may prevent the temperature inside the storage device 200 from rapidly increasing or decreasing due to the external temperature of the enclosure assembly 123.

Figure 9:
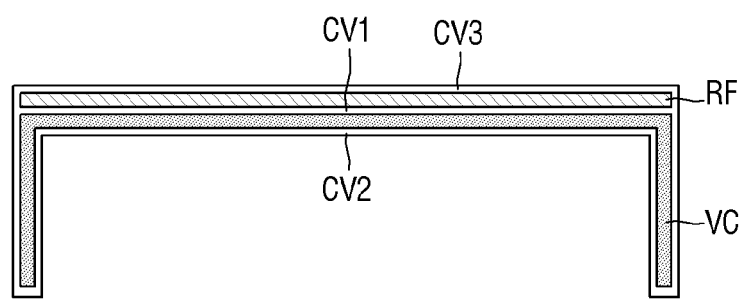
Figure 9:
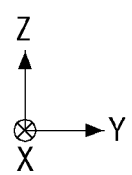

Referring to FIGS. 5, 6, and 9, the first enclosure 121 may include a first cover layer CV1, a second cover layer CV2, and a third cover layer CV3. The second cover layer CV2 and the third cover layer CV3 may define the exterior shape of the first enclosure 121. The first cover layer CV1 may be disposed between the second cover layer CV2 and the third cover layer CV3. The first cover layer CV1 may be disposed above the second cover layer CV2. The third cover layer CV3 may be disposed above the first cover layer CV1.

The third cover layer CV3 may define the outer surface of the first enclosure 121. That is, the third cover layer CV3 may include a surface not facing the memory module 140. The second cover layer CV2 may define the inner surface of the second enclosure 122. That is, the second cover layer CV2 may include a surface facing the memory module 140. The first cover layer CV1 may serve as a separation membrane between a vacuum layer VC and a refrigerant layer RF.

The first enclosure 121 may include a space between the first cover layer CV1, the second cover layer CV2, and the third cover layer CV3.

The first enclosure 121 may include a space between the first cover layer CV1 and the third cover layer CV3. The space between the first cover layer CV1 and the third cover layer CV3 may include a refrigerant material. That is, the first enclosure 121 may include the refrigerant layer RF between the first cover layer CV1 and the third cover layer CV3. The first enclosure 121 may include a refrigerant layer RF above the vacuum layer VC.

The refrigerant layer RF may extend along an upper surface of the vacuum layer VC. The vacuum layer VC may further extend along the side surfaces SF1 to SF3 of the first enclosure 121. The refrigerant layer RF does not extend along the side surfaces SF1 to SF3 of the first enclosure 121.

When an internal temperature of the enclosure assembly 123 is rapidly varied due to an external temperature, the refrigerant layer RF may cool the internal temperature of the enclosure assembly 123.

Figure 10:
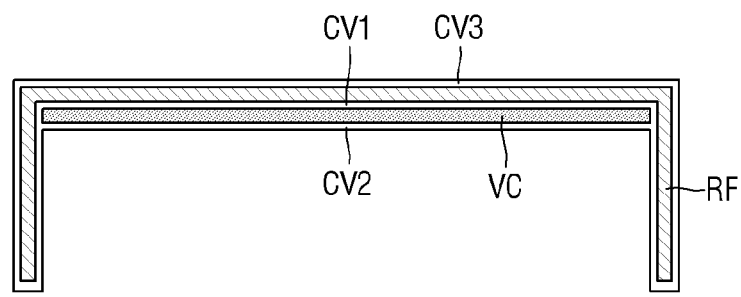

Referring to FIGS. 5, 6, and 10, the first enclosure 121 may include a first cover layer CV1, a second cover layer CV2, and a third cover layer CV3. The first cover layer CV1, the second cover layer CV2, and the third cover layer CV3 may define the exterior shape of the first enclosure 121.

The first cover layer CV1 may be disposed above the second cover layer CV2. The third cover layer CV3 may be disposed above the first cover layer CV1.

The first enclosure 121 may include a space between the first cover layer CV1 and the third cover layer CV3. The space between the first cover layer CV1 and the third cover layer CV3 may include a refrigerant material. That is, the first enclosure 121 may include a refrigerant layer RF between the first cover layer CV1 and the third cover layer CV3. The first enclosure 121 may include the vacuum layer VC between the first cover layer CV1 and the second cover layer CV2.

The refrigerant layer RF may be disposed above the vacuum layer VC. The refrigerant layer RF may surround the vacuum layer VC. The refrigerant layer RF may extend further to the side surfaces SF1 to SF3 of the first enclosure 121 than the vacuum layer VC.

Figure 11:
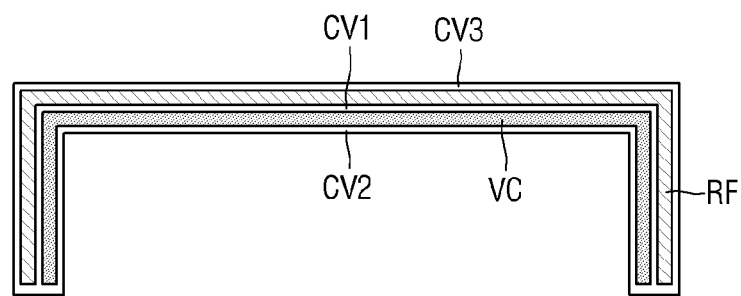
Figure 12:
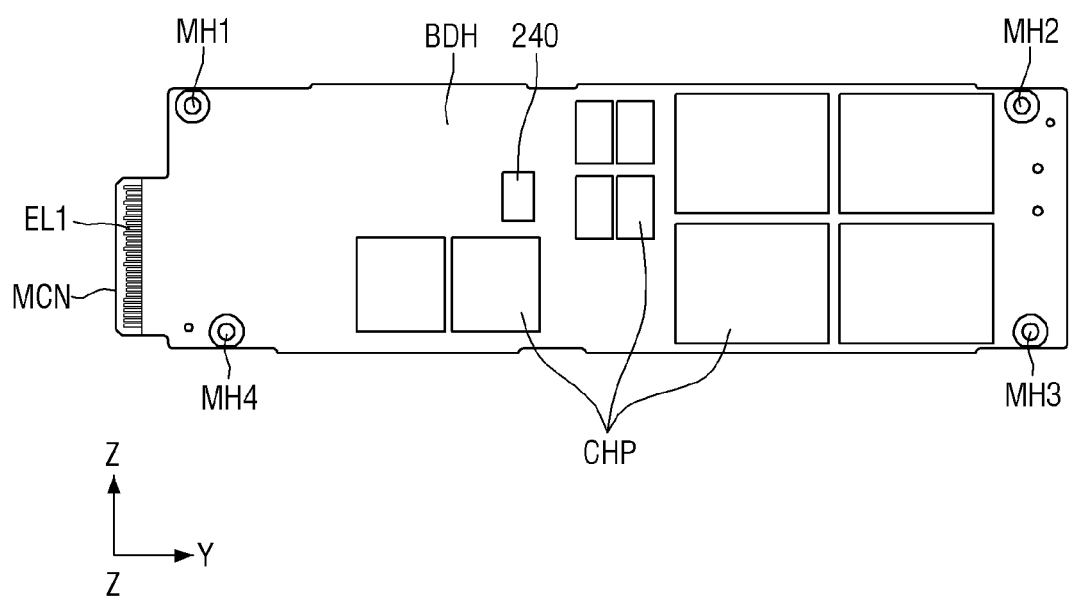
FIG. 12 is a plan view illustrating a memory module according to some embodiments.

Referring to FIGS. 5, 6, and 11, the first enclosure 121 may include a first cover layer CV1, a second cover layer CV2, and a third cover layer CV3 which conformally extend in sequence. The first cover layer CV1 may be disposed above the second cover layer CV2. The first cover layer CV1 may extend along a profile of the second cover layer CV2. The third cover layer CV3 may be disposed above the first cover layer CV1. The third cover layer CV3 may extend along a profile of the first cover layer CV1.

The second cover layer CV2 and the third cover layer CV3 may define the exterior shape of the first enclosure 121. The second cover layer CV2 may define the inner surface of the first enclosure 121. The third cover layer CV3 may define the outer surface of the first enclosure 121.

The first enclosure 121 may include a refrigerant layer RF between the first cover layer CV1 and the third cover layer CV3. The first enclosure 121 may include a vacuum layer VC between the first cover layer CV1 and the second cover layer CV2. The refrigerant layer RF may be disposed above the vacuum layer VC. The refrigerant layer RF may extend along a profile of the vacuum layer VC. The refrigerant layer RF and the vacuum layer VC may extend along the side surfaces SF1 to SF3 of the first enclosure 121.

When compared to FIG. 8, in FIGS. 9 to 11, although it is illustrated that a thickness of the upper surface UF of the first enclosure 121 is greater than the thickness of each of the side surfaces SF1 to SF3, the embodiment is not limited thereto. Even when the first enclosure 121 includes both the vacuum layer VC and the refrigerant layer RF, the thickness of the upper surface UF may be the same as the thickness of each of the side surfaces SF1 to SF3.

In addition, when compared to FIGS. 8 to 10, in FIG. 11, although it is illustrated that the thickness of each of the side surfaces SF1 to SF3 of the first enclosure 121 is greater, the embodiment is not limited thereto.

Although FIGS. 8 to 11 illustrate only the first enclosure 121, this is an example for describing the enclosure assembly 123, and the present disclosure is not limited thereto. For example, the second enclosure 122 may include a plurality of cover layers, and a vacuum is present between the plurality of cover layers. The second enclosure 122 may include a plurality of cover layers, and a refrigerant material may be included between the cover layers. In addition, for reference, FIGS. 8 to 11 are schematic diagrams for describing the first enclosure 121, and the external temperature sensor 230 and fixing holes DH1 to DH3 are omitted.

Referring to FIGS. 5, 6, 7, and 12, the memory module 140 may include the module board BDH, the memory connector MCN provided on at least one end of the module board BDH, and the electronic devices CHP disposed on at least one surface of the module board BDH.

The module board BDH may include one or more insulating layers and one or more wiring layers. The module board BDH may include a printed circuit board.

The module board BDH may be formed in a flat-plate shape. The module board BDH may generally lie on the XY plane. A general planar shape of the module board BDH may be similar to the planar shape of the storage device 200. For example, when the storage device 200 has a rectangular shape or a similar exterior in a plan view, the module board BDH may also have a rectangular shape or a similar exterior.

In a plan view, a size of the module board BDH is smaller than or close to the size of the storage device 200. For example, an area occupied by the module board BDH of an area occupied by the storage device 200 may range from 50% to 99%.

In a plan view, the module board BDH may occupy a central portion of the storage device 200 and each side of the module board BDH may be located inward from a corresponding side of the storage device 200. Excluding some sections, the enclosure assembly 123 is disposed in a space between each side of the module board BDH and each side of the storage device 200 to prevent the module board BDH from being exposed to the outside.

The module board BDH may include one or more module fastening holes MH1 to MH4. When a plurality of module fastening holes MH1 to MH4 are present, the module fastening holes MH1 to MH4 may have the same size and the same shape, but the present disclosure is not limited thereto.

The module fastening holes MH1 to MH4 pass through the module board BDH in the third direction Z (a thickness direction). The module fastening holes MH1 to MH4 provide spaces in which fastening members such as screw bolts, screws, pieces, and bolts are inserted. Hereinafter, a screw bolt is exemplified as a fastening member, and it is obvious that various members which perform coupling by being inserted into a hole or a groove, similar to the screw bolt, may be equally applied.

The module fastening holes MH1 to MH4 may be disposed at the corner portions CNR1 to CNR4 of the module board BDH. The module fastening holes MH1 to MH4 may include a first module fastening hole MH1 disposed at the first corner portion CNR1, a second module fastening hole MH2 disposed at the second corner portion CNR2, a third module fastening hole MH3 disposed at the third corner portion CNR3, and a fourth module fastening hole MH4 disposed at the fourth corner portion CNR4. However, the present disclosure is not limited thereto and the module fastening holes MH1 to MH4 may be omitted from some corner portions and may be further installed in areas (e.g., the central portion and areas adjacent to the sides) instead of the corner portions.

Positions of the module fastening holes MH1 to MH4 may be variously changed based on the corner portions CNR1 to CNR4.

The memory connector MCN may be disposed at an end portion of one side of the module board BDH. In the drawings, although a case in which the memory connector MCN is connected to the first short side SS1 of the module board BDH and protrudes outward from the first short side SS1 of the module board BDH in the first direction X is illustrated, the present disclosure is not limited thereto, and the memory connector MCN may be disposed on another side or disposed on a plurality of sides.

The memory connector MCN is connected to the module board BDH. The memory connector MCN may be provided as a separate member from the module board BDH and attached thereto, and the memory connector MCN may also be integrally provided with the module board BDH. When the memory connector MCN is integrally provided with the module board BDH, the memory connector MCN may be provided in a protruding area of the module board BDH in which a portion of the module board BDH protrudes outward.

The memory connector MCN may include a plurality of connection terminals EL1. The plurality of connection terminals EL1 may be disposed apart from each other in the second direction Y. Each connection terminal EL1 of the memory connector MCN may be connected to each corresponding connection terminal EL1 of a host connector.

Each connection terminal EL1 of the memory connector MCN may be connected to the wiring of the module board BDH. When the memory connector MCN is integrally provided with the module board BDH, the connection terminals EL1 of the memory connector MCN may be formed on the same layer using the same material as the wiring of the module board BDH. Each connection terminal EL1 may have a shape of a pad electrode of which a width is greater than a width of the wiring of the module board BDH. The plurality of connection terminals EL1 may be exposed to the outside in a state without being at least partially covered by the insulating layer. The plurality of connection terminals EL1 may be disposed on the upper surface UF or the bottom surface BF of the memory connector MCN. In some cases, the plurality of connection terminals EL1 may be disposed on both the upper surface UF and the bottom surface BF of the memory connector MCN. Alternatively, the memory connector MCN may include a plurality of layers separated in the thickness direction, and the plurality of connection terminals EL1 may be disposed on at least one surface of each layer.

A size, a shape, and a position of the above-described memory connector MCN and an arrangement of the above-described connection terminals EL1 may conform to a predetermined standard. For example, the size, the shape, and the position of the above-described connector MCN and the arrangement of the above-described connection terminals EL1 may correspond to standards such as E1.S, M.2, and NF2.

The electronic device CHP is disposed on the upper surface UF and/or the bottom surface BF of the module board BDH. The electronic device CHP may be manufactured in the form of a separate chip from the module board BDH and mounted on the module board BDH.

The electronic device CHP may include a semiconductor device. Specifically, the electronic device CHP may include the NVM device 220, the buffer memory device 216, and the memory controller 210 for controlling the NVM device 220 and the buffer memory device 216. The electronic device CHP may further include a capacitor element. Each electronic device CHP may be connected to the wiring of the module board BDH to perform an electrical operation. The plurality of electronic devices CHP may be spaced apart from each other. A horizontal gap may be defined as a separation space between the electronic devices CHP. The horizontal gap may be filled with air or the like.

The ITS 240 may be disposed on the upper surface of the module board BDH. The ITS 240 may be connected to the memory controller 210 on the module board BDH in a wired or wireless manner. The ITS 240 may measure the internal temperature of the storage device 200 on the module board BDH. Specifically, the ITS 240 may measure a temperature inside the enclosure assembly 123 on the module board BDH.

In FIG. 12, although it is illustrated that the ITS 240 is disposed on the upper surface of the module board BDH, the embodiment is not limited thereto. For example, the ITS 240 may be disposed on the lower surface of the module board BDH.

In FIGS. 5 and 12, although the NVM device 220, the buffer memory device 216, the memory controller 210, and the ITS 240 are illustrated as semiconductor devices disposed at specific positions, this is for convenience of description and the embodiment is not limited thereto. For example, the positions of the NVM device 220, the buffer memory device 216, the memory controller 210, and the ITS 240 may be changed from each other.

Figure 13:
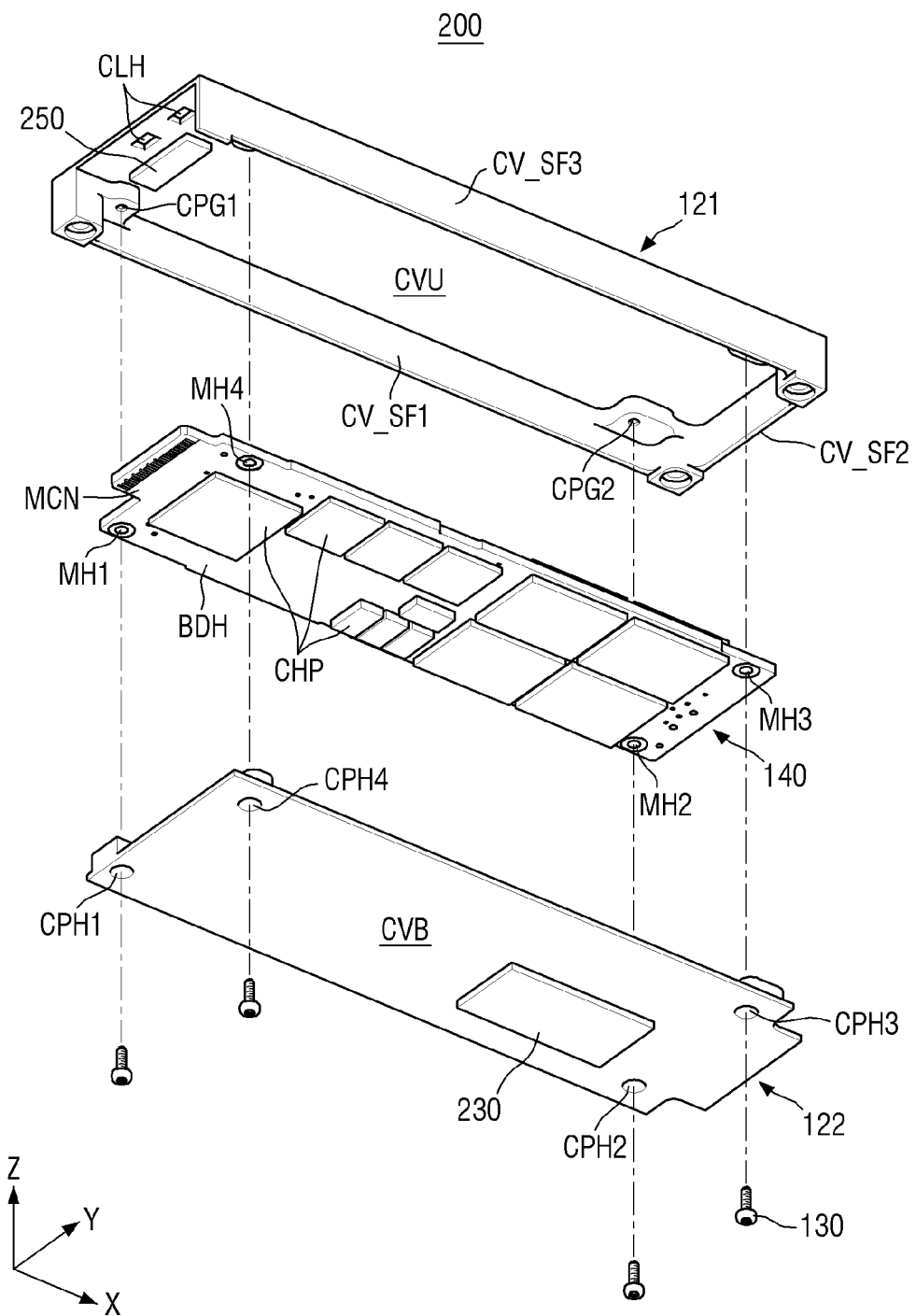
FIG. 13 is an exploded perspective view illustrating a storage device according to some embodiments.

FIG. 13 is an exploded perspective view illustrating a storage device according to some embodiments. For convenience of description, a difference from the description made with reference to FIGS. 4 to 12 will be mainly described.

Referring to FIG. 13, the ETS 230 may be disposed on the outer surface of the second enclosure 122.

In FIG. 13, although it is illustrated that the ETS 230 is disposed to be closer to the second coupling hole CPH2 and the third coupling hole CPH3 than to the first coupling hole CPH1 and the fourth coupling hole CPH4 on the outer surface of the second enclosure 122, the embodiment is not limited thereto. For example, a position at which the VS 250 is disposed on the outer surface of the second enclosure 122 may be variously modified according to embodiments.

The VS 250 may be disposed on an inner surface of the first enclosure 121. The VS 250 may be disposed at an edge of the first enclosure 121. As shown in FIG. 13, the VS 250 may be disposed between the first coupling groove CPG1 and the fourth coupling groove CPG4. The VS 250 may be disposed to be closer to the central portion of the first enclosure 121 than the clamping holes CLH. In this case, when the memory connector MCN and the host connector are connected through the clamping holes CLH, the VS 250 may be disposed at a position not interfering with the connection between the memory connector MCN and the host connector.

Figure 14:
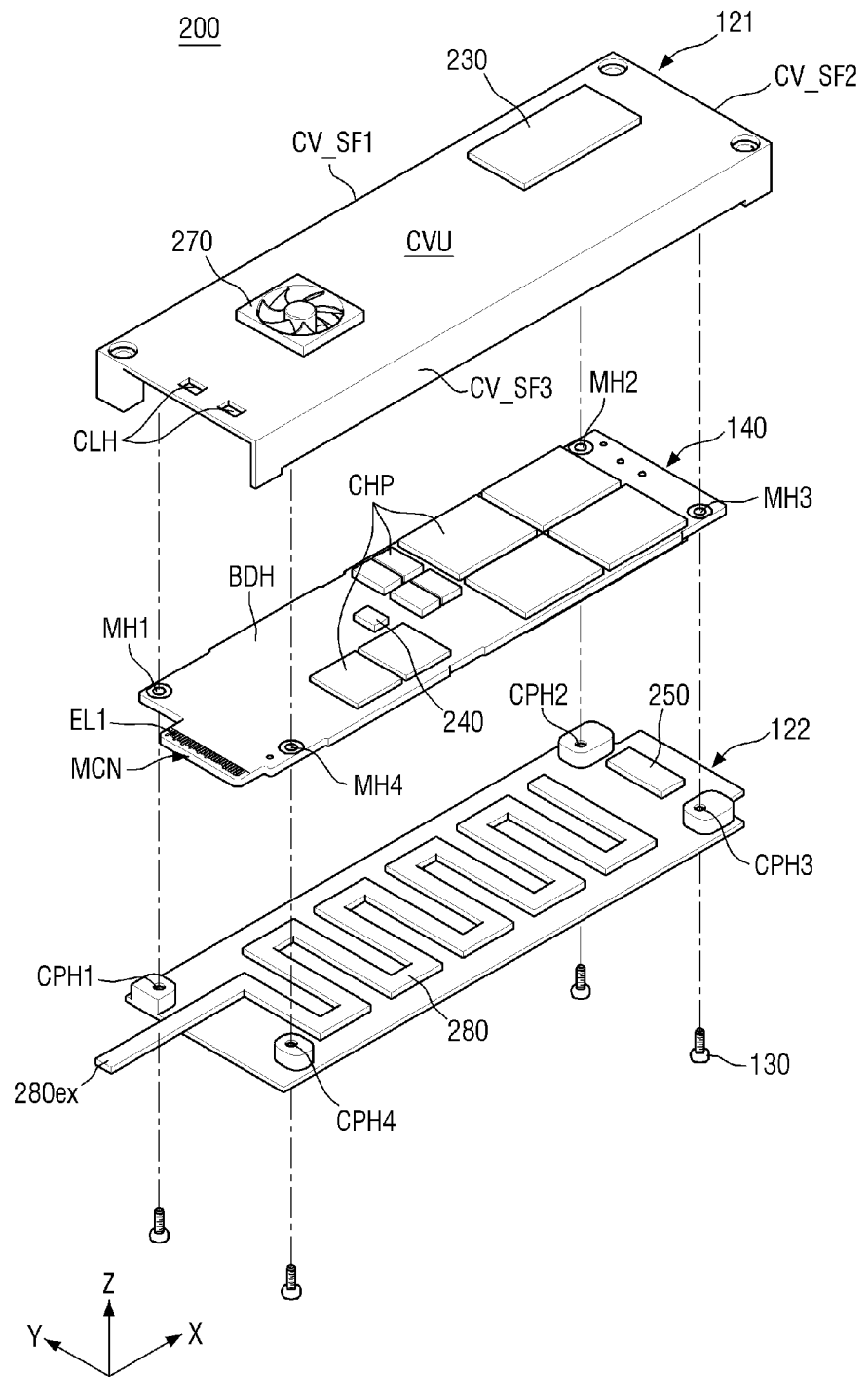
FIG. 14 is an exploded perspective view of a storage device according to some other embodiments.
Figure 15:
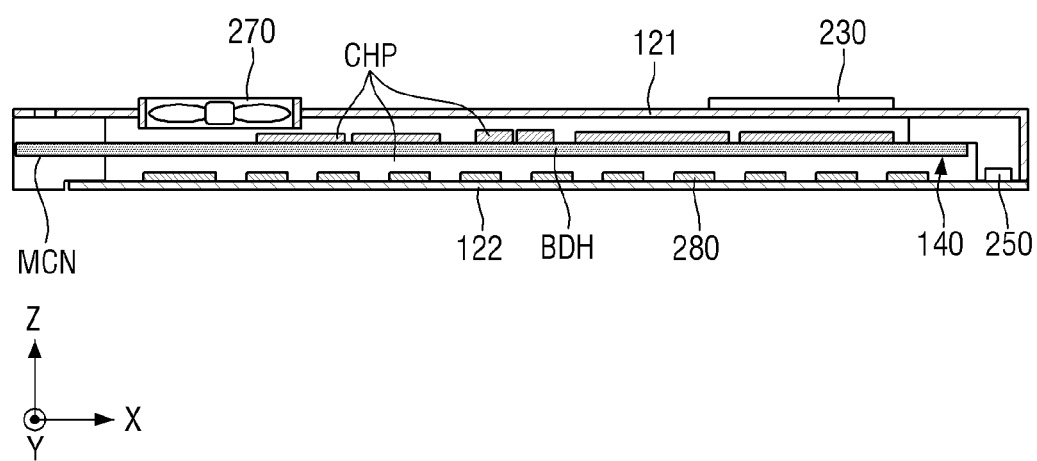
FIG. 15 is a cross-sectional view taken in a first direction of the storage device of FIG. 14.

FIG. 14 is an exploded perspective view of a storage device according to some other embodiments. FIG. 15 is a cross-sectional view taken in a first direction of the storage device of FIG. 14. For convenience of description, a difference from the description made with reference to FIGS. 4 to 7 will be mainly described.

Referring to FIGS. 14 and 15, a storage device 200 may further include a cooling fan 270 and a cooling pipeline 280.

The cooling fan 270 may be disposed in a first enclosure 121. Specifically, the cooling fan 270 may be disposed to pass air through the first enclosure 121. The cooling fan 270 may pass air through the first enclosure 121 to cool the heat inside the enclosure assembly 123. The cooling fan 270 may be connected to a power device disposed in a memory module 140.

The cooling pipeline 280 may be disposed on an inner surface of a second enclosure 122. The cooling pipeline 280 may extend while in contact with the inner surface of the second enclosure 122. The cooling pipeline 280 may extend on the inner surface of the second enclosure 122 in a zigzag manner.

The cooling pipeline 280 may extend to an outer side of the second enclosure 122. The cooling pipeline 280 may include an extension 280ex. For example, the extension 280ex of the cooling pipeline 280 may extend between the first coupling hole CPH1 and the fourth coupling hole CPH4. The cooling pipeline 280 may receive a cooling material through the extension 280ex extending to the outside of the second enclosure 122. For example, the cooling pipeline 280 may receive an external refrigerant. As another example, the cooling pipeline 280 may receive external air. The cooling material supplied through the cooling pipeline 280 may cool the heat generated inside the storage device 200.

In FIG. 15, although it is illustrated that the cooling pipeline 280 is not in contact with the memory module 140, the embodiment is not limited thereto. For example, the cooling pipeline 280 may be in contact the memory module 140. The cooling pipeline 280 may be in contact with an electronic device CHP disposed on a lower surface of the memory module 140. In this case, the cooling pipeline 280 may be made of a material not affecting the electrical operation of the electronic device CHP.

In FIG. 15, although it is illustrated that the ETS 230 and the cooling fan 270 are disposed in the first enclosure 121, the embodiment is not limited thereto. For example, the cooling fan 270 may be disposed in the second enclosure 122. The cooling fan 270 may be disposed to pass air through the second enclosure 122.

In addition, although it is illustrated that the VS 250 and the cooling pipeline 280 are disposed in the second enclosure 122, the embodiment is not limited thereto. Positions at which the ETS 230, the VS 250, the cooling fan 270, and the cooling pipeline 280 are disposed may be variously changed in the storage device 200 according to embodiments.

Figure 16:
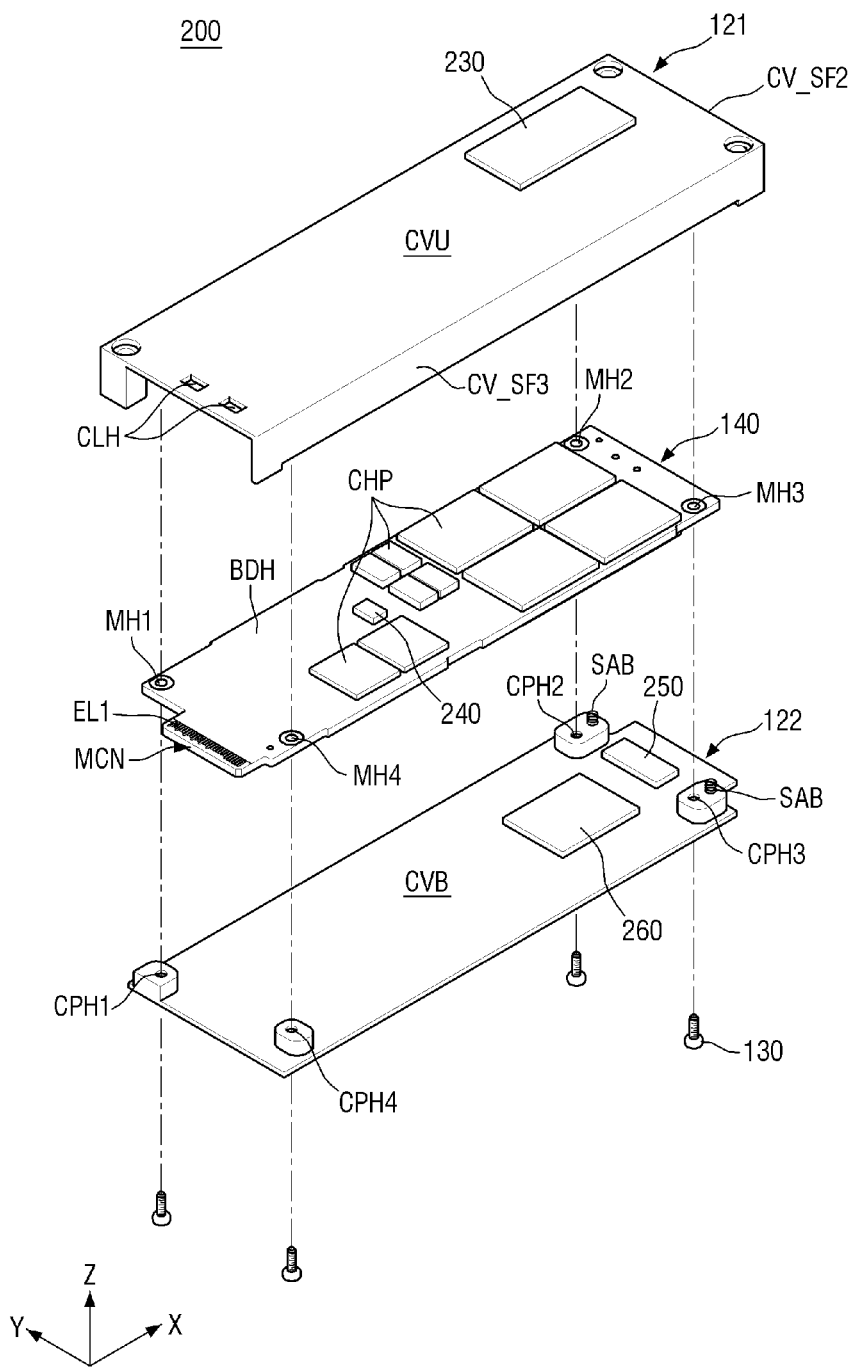
FIG. 16 is an exploded perspective view of a storage device according to still some other embodiments.

FIG. 16 is an exploded perspective view of a storage device according to still some other embodiments. For convenience of description, a difference from the description made with reference to FIGS. 4 to 7 will be mainly described.

Referring to FIGS. 1 and 16, a storage device 200 may include a PS 260 and buffers SAB.

The PS 260 may be disposed on an inner surface of a second enclosure 122. For example, the PS 260 may be disposed more adjacent to a central portion of the second enclosure 122 than a second coupling hole CPH2 and a third coupling hole CPH3 on the inner surface of the second enclosure 122.

In FIG. 16, although it is illustrated that the PS 260 is disposed on the inner surface of the second enclosure 122, the embodiment is not limited thereto. For example, the PS 260 may be disposed on an outer surface of the second enclosure 122. The PS 260 may be disposed on the outer surface or the inner surface of a first enclosure 121. That is, according to embodiments, a position of the PS 260 may be set to an appropriate position for measuring a pressure affecting the storage device 200.

The PS 260 may measure an external pressure exerted on the storage device 200. The PS 260 may provide data on the measured external pressure to a memory controller 210.

The memory controller 210 may control an operation of the storage device 200 on the basis of the data on the external pressure provided from the PS 260. For example, when an external pressure level is greater than or equal to a threshold value, the memory controller 210 may temporarily interrupt an operation of an NVM device 220. The memory controller 210 may temporarily interrupt a write operation on the NVM device 220. As another example, when the external pressure level is greater than or equal to the threshold value, the memory controller 210 may provide a signal informing the host device 100 of the external pressure.

The buffer SAB may alleviate an impact to the storage device 200. For example, the buffer SAB may absorb a physical impact to the storage device 200. The buffer SAB may buffer an impact affecting the storage device 200, thereby preventing a risk factor for the operation of the storage device 200.

The buffer SAB may have a structure that acts as a buffer. For example, the buffer SAB may have a spring structure. As another example, the buffer SAB may have a cushioning structure such as a sponge.

The buffer SAB may be disposed at a position where the probability of an occurrence of an impact to the storage device 200 is high. For example, the buffer SAB may be disposed at a position where the storage device 200 is fastened to an external device. The buffer SAB may be disposed at an edge of the second enclosure 122. The buffer SAB may be disposed in each side portion of the second coupling hole CPH2 and the third coupling hole CPH3.

A plurality of buffers SAB may be disposed. Alternatively, the storage device 200 may include one buffer SAB. For example, one buffer SAB may be disposed between the second coupling hole CPH2 and the third coupling hole CPH3. The number of buffers SAB and a position thereof may be variously changed according to embodiments.

Figure 17:
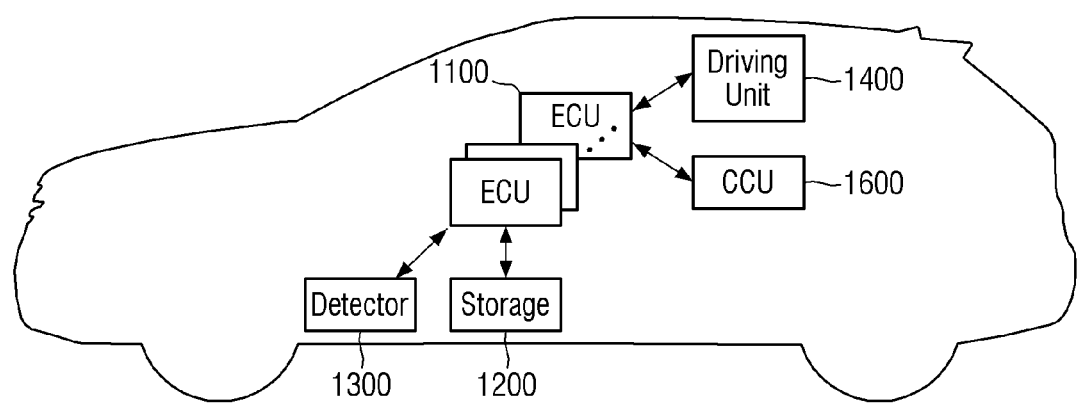
FIG. 17 is a diagram illustrating a vehicle including the storage device according to some embodiments.

FIG. 17 is a diagram illustrating a vehicle including the storage device according to some embodiments.

Referring to FIGS. 1 and 17, a vehicle 1001 may include a plurality of electronic control units (ECUs) and a storage 1200. The storage 1200 may correspond to the storage device 200 of FIG. 1.

Each of the plurality of ECUs 1100 may be electrically, mechanically, and communicatively connected to at least one among a plurality of devices provided in the vehicle 1001 and may control an operation of at least one device on the basis of any one among function execution commands.

Here, the plurality of devices may include a detector 1300 for acquiring information required to perform at least one function and a driving unit 1400 for performing at least one function.

For example, the detector 1300 may include various detection parts and various image acquisition parts and the driving unit 1400 may include a fan and a compressor of an air conditioning device, a fan of a ventilation device, an engine and a motor of a power device, a motor of a steering device, a motor and a valve of a braking device, and an opening/closing device of a door or a tailgate.

The plurality of ECUs 1100 may perform communication with the detector 1300 and the driving unit 1400 using, for example, at least one among Ethernet, low voltage differential signal (LVDS) communication, and local interconnect network (LIN) communication.

The plurality of ECUs 1100 determine whether a function needs to be performed on the basis of the information acquired through the detector 1300, and when it is determined that the function needs to be performed, the plurality of ECUs 1100 control the operation of the driving unit 1400 performing a corresponding function, and the plurality of ECUs 1100 may control an amount of the operation of the driving unit 1400 on the basis of the acquired information. The plurality of ECUs 1100 may store the acquired information in the storage 1200 or read and use information stored in the storage 1200.

A connectivity control unit (CCU) 1600 is electrically, mechanically, and communicatively connected to the plurality of ECUs 1100 and performs communication with each of the plurality of ECUs 1100.

That is, the CCU 1600 is able to directly communicate with the plurality of ECUs 1100 provided inside the vehicle, communicate with an external server, and communicate with an external terminal through an interface.

Here, the CCU 1600 may communicate with the plurality of ECUs 1100.

In addition, the CCU 1600 may communicate with a server through wireless communication. In this case, in addition to a wireless fidelity (WiFi) module and a wireless broadband Internet (WiBro) module, the wireless communication between the CCU 1600 and the server may be performed through various wireless communication methods such as global system for mobile communication (GSM), code division multiple access (CDMA), wideband CDMA (WCDMA), universal mobile telecommunications system (UMTS), time division multiple access (TDMA), and long term evolution (LTE).

The storage 1200 may detect an external risk factor which may occur as the vehicle 1001 operates. Specifically, the ETS 230 of the storage 1200 may detect external heat generated during traveling of the vehicle 1001. The ETS 230 may measure an external temperature of the storage 1200, which varies due to the traveling of the vehicle 1001. The ETS 230 may provide the measured external temperature to the memory controller 210, and thus the storage device 200 responds to the variation in external temperature. For example, when the storage 1200 is exposed to a high temperature due to the traveling of the vehicle 1001, the ETS 230 may provide the memory controller 210 with data on an external temperature that is greater than or equal to a threshold value. In this case, after the risk factor due to the external temperature is removed, the memory controller 210 may control the storage 1200 to operate.

The VS 250 of the storage 1200 may detect a vibration generated during the traveling of the vehicle 1001. The VS 250 of the storage 1200 may notify the memory controller 210 of a vibration in an abnormal range, which occurs during the traveling of the vehicle 1001. When a vibration level determined within an abnormal range due to an external impact is measured while the vehicle 1001 travels, the VS 250 may provide data on the vibration to the memory controller 210. In response to the data on the vibration, the memory controller 210 may control the storage 1200 to respond to the external impact. For example, when the vibration level determined within the abnormal range is measured, the memory controller 210 may temporarily interrupt the operation of the NVM device 220. As another example, when a vibration within a preset range is measured, the memory controller 210 may reduce an operating speed of the NVM device 220.

Meanwhile, when the vibration within the preset range is continuously measured for a specific time, the memory controller 210 may resume the temporarily interrupted operation of the NVM device 220. Alternatively, when the vibration within the preset range is continuously measured for a specific time, the memory controller 210 may restore the operating speed of the NVM device 220 to its original speed.

Figure 18:
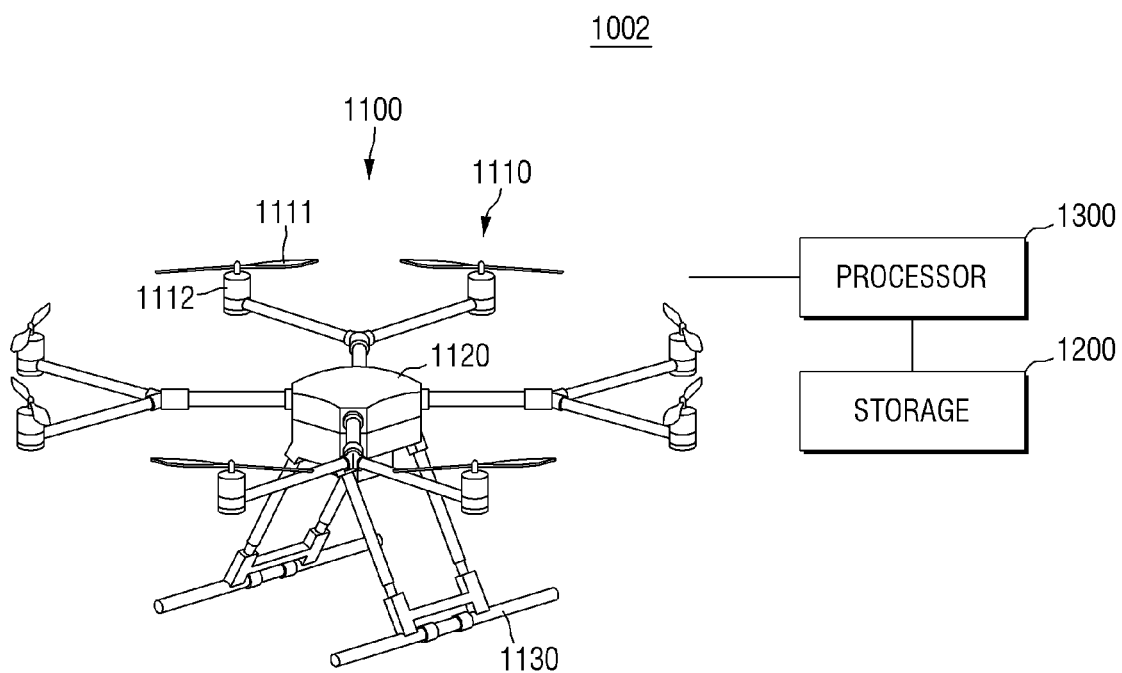
FIG. 18 is a diagram illustrating a drone including the storage device according to some embodiments.

FIG. 18 is a diagram illustrating a drone including the storage device according to some embodiments. For convenience of description, a difference from the description made with reference to FIG. 17 will be mainly described.

Referring to FIGS. 1 and 18, a drone 1002 may include a main body 1100, a storage 1200, and a processor 1300. The storage 1200 may correspond to the storage device 200 described with reference to FIG. 1.

The processor 1300 may control the overall operation of the drone 1002. The main body 1100 may include an actuated propulsion device 1110, a body 1120, and landing legs 1130.

A plurality of actuated propulsion devices 1110 may be installed. The plurality of actuated propulsion devices 1110 may be connected to the body 1120 and disposed apart from each other. The actuated propulsion device 1110 may include a propeller 1111 and a motor 1112. The propeller 1111 may be vertically connected to the body 1120.

The landing legs 1130 may be disposed apart from each other on a bottom surface of the body 1120. In addition, although not shown in the drawing, a buffer support member for minimizing an impact due to a collision with the ground when the drone 1002 lands may be mounted in a lower portion of the landing leg 1130.

The storage 1200 may detect an external risk factor which may occur as the drone 1002 operates. Specifically, the ETS 230 of the storage 1200 may detect the external heat generated during the flight of the drone 1002. The ETS 230 may measure an external temperature that varies due to the flight of the drone 1002. The ETS 230 may provide the measured external temperature to the memory controller 210, and thus the storage 1200 responds to the variation in external temperature. For example, when the storage 1200 is exposed to a high temperature due to the flight of the drone 1002, the ETS 230 may provide the memory controller 210 with data on the external temperature that is greater than or equal to a threshold value. In this case, after the risk factor due to the external temperature is removed, the memory controller 210 may control the storage 1200 to operate.

The VS 250 of the storage 1200 may detect a vibration generated during the flight of the drone 1002. The VS 250 of the storage 1200 may notify the memory controller 210 of a vibration within an abnormal range, which occurs during the flight of the drone 1002. When a vibration level determined within an abnormal range due to an external impact is measured while the drone 1002 flies, the VS 250 may provide data on the vibration to the memory controller 210. In response to the data on the vibration, the memory controller 210 may control the storage 1200 to respond to the external impact. For example, when the vibration level within a preset range is measured, the memory controller 210 may temporarily interrupt the operation of the NVM device 220. As another example, when a vibration within a preset range is measured, the memory controller 210 may reduce an operating speed of the NVM device 220.

Meanwhile, when the vibration within the preset range is continuously measured for a specific time, the memory controller 210 may resume the temporarily interrupted operation of the NVM device 220. Alternatively, when the vibration within the preset range is continuously measured for a specific time, the memory controller 210 may restore the operating speed of the NVM device 220 to its original speed.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:
1. A storage device comprising:
   a memory module including a memory device, a module board including a memory controller configured to control the memory device, and a memory connector disposed on one side of the module board;

a first enclosure disposed on a first surface of the memory module;

a second enclosure disposed on a second surface opposite to the first surface of the memory module; and a first sensor disposed on the first enclosure and configured to detect a state and provide a signal for the state to the memory controller, wherein the first sensor comprises an external temperature sensor disposed on an outer surface of the first enclosure, the external temperature sensor being configured to measure an external temperature of the first enclosure and to provide measurement data to the memory controller, and wherein the outer surface of the first enclosure on which the external temperature sensor is disposed faces away from the first surface of the memory module.

2. A storage device comprising:

a memory module including a memory device, a module board including a memory controller configured to control the memory device, and a memory connector disposed on one side of the module board;

a first enclosure disposed on a first surface of the memory module;

a second enclosure disposed on a second surface opposite to the first surface of the memory module; and a first sensor disposed on the first enclosure and configured to detect a state and provide a signal for the state to the memory controller, wherein:

the first enclosure includes a first long side extending in a first direction and a first short side extending in a second direction perpendicular to the first direction, and a ratio of the first long side to the first short side ranges from 1.2 to 3.5 wherein the first sensor includes a vibration sensor configured to measure a vibration level, the vibration sensor is configured to provide vibration data on the vibration level to the memory controller, and in response to the vibration data provided from the vibration sensor, the memory controller is configured to interrupt an operation on the memory device when the vibration level falls within a preset range.

3. The storage device of claim 2, wherein when the vibration data indicating that the vibration level is included in the preset range is continuously provided to the memory controller for a preset time, the memory controller resumes the operation on the memory device.

4. The storage device of claim 3, wherein the memory controller resumes the operation on the memory device in a low-speed mode.

5. The storage device of claim 2, further comprising:

a plurality of fastening parts disposed between the first enclosure and the second enclosure in a third direction perpendicular to the first direction and the second direction and configured to connect the first enclosure to the second enclosure, wherein the vibration sensor is disposed between the plurality of fastening parts.

6. A storage device comprising:

a memory module including a memory device, a module board including a memory controller configured to control the memory device, and a memory connector disposed on one side of the module board;

a first enclosure disposed on a first surface of the memory module;

a second enclosure disposed on a second surface opposite to the first surface of the memory module; and a first sensor disposed on the first enclosure and configured to detect a state and provide a signal for the state to the memory controller, wherein the first sensor comprises an external temperature sensor disposed on an outer surface of the first enclosure, the external temperature sensor being configured to measure an external temperature of the first enclosure and to provide measurement data to the memory controller, wherein the outer surface of the first enclosure on which the external temperature sensor is disposed faces away from the first surface of the memory module, the first enclosure includes a first long side extending in a first direction and a first short side extending in a second direction perpendicular to the first direction, and a ratio of the first long side to the first short side ranges from 1.2 to 3.5.

7. The storage device of claim 6, wherein:

the memory module further includes an internal temperature sensor disposed on the module board and configured to measure an internal temperature of the first enclosure and provide data on the internal temperature to the memory controller, and the memory controller controls an operating speed of the memory device according to a difference value between the external temperature measured by the external temperature sensor and the internal temperature measured by the internal temperature sensor.

8. The storage device of claim 7, wherein the memory controller models a temperature of the memory device using the external temperature and the internal temperature.

9. The storage device of claim 6, wherein when the external temperature is greater than or equal to a threshold value, the memory controller provides a signal informing a host of the external temperature.

10. The storage device of claim 6, wherein:

the module board further includes a buffer memory device configured to temporarily store data, and in response to the data on the external temperature provided from the external temperature sensor, when the external temperature corresponds to a first level, the memory controller programs the data temporarily stored in the buffer memory device to the memory device and erases the data temporarily stored in the buffer memory device.

11. The storage device of claim 10, wherein in response to the data on the external temperature provided from the external temperature sensor, when the external temperature corresponds to a second level that is higher than the first level, the memory controller interrupts a write operation of data to the memory device or a read operation of data from the memory device for a preset time.

12. The storage device of claim 10, wherein the memory controller programs the data temporarily stored in the buffer memory device to the memory device, erases the data temporarily stored in the buffer memory device, and then turns power off.

13. The storage device of claim 6, wherein:

the first sensor includes an antenna, and the first sensor provides a signal for the state to the memory controller using the antenna through wireless communication.

14. The storage device of claim 6, wherein each of the first enclosure and the second enclosure includes:
   a first cover and a second cover disposed inside the first cover, and
   a gap between the first cover and the second cover in a vacuum state.

15. The storage device of claim 14, wherein each of the first enclosure and the second enclosure includes:
   a third cover disposed on an outer side of the first cover, and
   a refrigerant layer between the first cover and the third cover.

16. The storage device of claim 6, further comprising a cooling fan disposed to pass air through any one of the first enclosure and the second enclosure.

17. The storage device of claim 6, further comprising a cooling pipeline configured to extend along an inner surface of the second enclosure on the inner surface.

18. The storage device of claim 17, further comprising:
   a plurality of fastening parts disposed between the first enclosure and the second enclosure in a third direction perpendicular to the first direction and the second direction and configured to connect the first enclosure to the second enclosure, wherein:
   the cooling pipeline is connected to an extension extending outside of the first enclosure and the second enclosure between the plurality of fastening parts, and
   the cooling pipeline receives air or a refrigerant supplied from the extension.

19. The storage device of claim 6, wherein the first sensor includes a pressure sensor configured to measure a pressure level.

20. The storage device of claim 6, further comprising a physical support buffer disposed between the first enclosure and the second enclosure in a third direction perpendicular to the first direction and the second direction.

* * * * *